(12) United States Patent
Yamada

(10) Patent No.: US 7,117,124 B2
(45) Date of Patent: Oct. 3, 2006

(54) TROUBLE DETECTION METHOD, TROUBLE DETECTION APPARATUS, AND TEMPERATURE CONTROLLER

(75) Inventor: Takaaki Yamada, Okayama (JP)

(73) Assignee: Omron Corporation, Kyoto (JP)

( * ) Notice: Subject to any disclaimer, the term of this patent is extended or adjusted under 35 U.S.C. 154(b) by 68 days.

(21) Appl. No.: 10/454,817

(22) Filed: Jun. 5, 2003

(65) Prior Publication Data

US 2004/0034509 A1   Feb. 19, 2004

(30) Foreign Application Priority Data

Jun. 12, 2002   (JP) ............................ P2002-170997
Nov. 22, 2002   (JP) ............................ P2002-339237

(51) Int. Cl.
*G06F 11/30* (2006.01)
(52) U.S. Cl. ........................................ 702/185; 700/79
(58) Field of Classification Search ........ 702/113–114, 702/130, 132, 136, 176, 178, 182–185, 187–188; 700/42, 79–81, 299–300; 374/101–102, 374/104; 376/215–216
See application file for complete search history.

(56) References Cited

U.S. PATENT DOCUMENTS

| | | | | |
|---|---|---|---|---|
| 4,935,607 A * | 6/1990 | Kadwell et al. | ............ | 219/508 |
| 5,043,862 A * | 8/1991 | Takahashi et al. | ............ | 700/42 |
| 5,197,375 A * | 3/1993 | Rosenbrock et al. | .......... | 99/328 |
| 5,778,852 A | 7/1998 | Penteker | | |
| 5,831,524 A * | 11/1998 | Tice et al. | .................. | 340/506 |
| 5,949,677 A | 9/1999 | Ho | | |
| 6,182,022 B1 * | 1/2001 | Mayle et al. | .............. | 702/182 |
| 6,746,908 B1 * | 6/2004 | Tanaka et al. | ............. | 438/225 |
| 6,754,542 B1 * | 6/2004 | Tanaka | ....................... | 700/42 |

FOREIGN PATENT DOCUMENTS

| | | |
|---|---|---|
| EP | 0 455 201 A2 | 11/1991 |
| JP | 02-024705 | 1/1990 |
| JP | 05-322261 | 7/1993 |
| JP | 2001-280674 | 10/2001 |

OTHER PUBLICATIONS

Masaki Yumoto et al., Fault Detection of Heat Source System for an Air Conditioning System by Stochastic Qualitative Reasoning, The Transactions of the Institute of Elecectrical Engineers of Japan, col. 116-C,-No. 11, Oct. 20, 1996, pp. 1281-1287.

\* cited by examiner

*Primary Examiner*—Marc S. Hoff
*Assistant Examiner*—Mary Catherine Baran
(74) *Attorney, Agent, or Firm*—Foley & Lardner LLP

(57) ABSTRACT

First determination means 16 determines whether a deviation exceeds a threshold value, measurement means 17 measures the period in which the deviation exceeds the threshold value in accordance with the determination result, second determination means determines whether the period in which the deviation exceeds the threshold value continues for a certain period or more in accordance with the measurement result, third determination means 19 determines whether the absolute value of the deviation decreases, and trouble determination means 2 determines that a trouble occurs when the period in which the deviation exceeds the threshold value continues for a certain period or more and the absolute value of the deviation does not decrease.

10 Claims, 18 Drawing Sheets

TROUBLE DETECTION METHOD, TROUBLE DETECTION APPARATUS, AND TEMPERATURE CONTROLLER

BACKGROUND OF THE INVENTION

1. Field of the Invention

The present invention relates to a trouble detection method and trouble detection apparatus for detecting a trouble in a control loop such as a disconnection or short circuit and a temperature controller, particularly to a trouble detection method and trouble detection apparatus preferred to detect a trouble such as a disconnection or short circuit in a control loop and a temperature controller.

2. Description of the Related Art

For example, as shown in FIG. 17, a temperature control system generally detects the temperature of a controlled system 1 such as a heating furnace by a temperature sensor 2 and inputs the temperature to a temperature controller 3'. The temperature controller 3' performs a PID operation or the like in accordance with a set temperature (target value) and a detected temperature, outputs an operation signal to an SSR 4, and controls the power distribution to a heater 5 by an AC power supply 6 so that the temperature of the controlled system 1 becomes the set temperature.

The temperature controller 3' has a sensor input circuit 7 to which an input is supplied from the temperature sensor 2, an A/D conversion circuit 8, a filter 9 according to software processing, control section 10 for performing an PID operation or the like, D/A conversion circuit 11, and output circuit 12.

In the case of the above temperature control system, to detect a trouble in a control loop such as disconnection of the heater 5 or temperature sensor 2 or short circuit of the SSR 4, it is necessary to detect a current by setting a current sensor to a place for detecting the current. Thus, the configuration becomes complex and the cost increases.

Therefore, an apparatus for detecting a trouble such as disconnection of a heater without using a current sensor is disclosed (for example, refer to Patent Document 1).

FIG. 18 is a block diagram showing a control loop system in the Patent Document 1.

A measured value PV from a controlled system 53 is input to a deviation circuit 57 and a trouble detection circuit 55 while an operation circuit 59 performs an PID operation in accordance with a deviation between a set value SV and the measured value PV to supply a manipulated variable MV to the controlled system 53 and the trouble detection circuit 55.

The trouble detection circuit 55 detects a trouble in the control loop system in accordance with the input manipulated variable MV and measured value PV.

That is, the trouble detection apparatus for the control loop system has counter means for counting predetermined trouble detection measurement time at a constant cycle, operation means for operating a manipulated variable for a controlled system in accordance with a measured value from the controlled system and a predetermined set value and outputting the operated manipulated variable to the controlled system, first determination means for determining whether the manipulated variable from the operation means is 0% or less or 100% or more, second determination means for determining a trouble depending on whether the measured value from the controlled system exceeds the range of a predetermined reference value for a measured value before start of the counting when the determination result by the first determination means is 0% or more or 100% or less of the manipulated variable and the counting means counts up the time, and trouble designation means for outputting a designation signal for designating a trouble in the control loop system of the controlled system when the measured value does not exceed the range of the predetermined reference value of the measured value before start of the counting in the second determination means.

The above configuration detects a trouble by counting a predetermined time from the point of time when a manipulated variable becomes 0% or less or 100% or more, detecting a change value of measured values at every predetermined time, and determining whether the change value exceeds a predetermined reference temperature range.

For example, in the normal state in which heating is continued by a heater up to a set temperature at a manipulated variable of 100%, a measured value rises over a predetermined reference temperature range every predetermined time. However, when the heater causes a disconnection, because the measured value cannot rise over the predetermined reference temperature range, it is possible to detect the trouble of heater disconnection.

Patent Document 1

U.S. Pat. No. 2,552,177

However, the above conventional example cannot detect a trouble unless a state does continues in which a manipulated value is 0% or less or 100% or more. Therefore, in a state in which the manipulated value is kept in a range of less than 100% over 0%, it is impossible to detect a trouble and thus trouble detection is delayed for a purpose requesting high-accuracy control.

Moreover, in the case of the above conventional example, when a set temperature corresponds to a manipulated variable of 100%, that is, when a manipulated variable in a steady state is 100%, for example, in a state in which a set temperature is set to 300° C. at a manipulated variable of 100%, the manipulated variable is 100% but temperature does not rise over a predetermined reference temperature range. Therefore, there is a difficult point that a trouble is erroneously determined.

SUMMARY OF THE INVENTION

The present invention is made to solve the above problems and its object is to make it possible to accurately detect a trouble in a control loop such as a disconnection or short circuit with a simple configuration and at a low cost.

To achieve the above object, the present invention is constituted as described below.

That is, a trouble detection method of the present invention is a method for detecting a trouble in a control loop including control means for outputting a manipulated variable for a controlled system in accordance with a deviation between a process variable fed back from the controlled system and a target value, in which it is determined that a trouble occurs when a state in which the deviation exceeds a threshold value continues for a certain period and the deviation does not decrease.

In this case, a process variable fed back from a controlled system denotes a signal fed back to control means from a detection apparatus for detecting a state of the controlled system such as a temperature state or pressure state. The process variable includes a signal processed by a filter set between a detection section and the control means such as a signal of a temperature estimated in accordance with a temperature detected by a temperature sensor serving as the detection section.

Moreover, a target value is a preferable value of a manipulated variable and when a target-value filter is used, the target value denotes a target value passing through the target filter.

A deviation denotes a difference between a process variable and a target value. Moreover, it is preferable that there are both a positive-side threshold value and negative-side threshold value. In addition, the deviation is equal to the threshold value.

According to the present invention, when a state in which a deviation exceeds a threshold value continues for a certain period and the deviation does not decrease, it is determined that a trouble occurs. Therefore, it is possible to detect a trouble in a control loop with a simple configuration and at a low cost without using a conventional current sensor or the like. Moreover, because a trouble is detected in accordance with not a manipulated variable but a deviation, it is possible to naturally detect the trouble compared to the case of the manipulated value and moreover, accurately detect the trouble by setting a threshold value.

Furthermore, a trouble detection method of the present invention is a method for detecting a trouble in a control loop including control means for outputting a manipulated variable for a controlled system in accordance with a deviation between a process variable fed back from the controlled system and a target value, which determines that a trouble occurs when a state in which the deviation exceeds a threshold value continues for a certain period and the absolute value of the deviation does not decrease.

In this case, the fact that the absolute value of the deviation does not decrease denotes that the absolute value of a positive or negative deviation does not decrease, that is, a process variable does not approach a target value. Therefore, the fact that the absolute value of a deviation does not decrease includes a case in which a process variable does not approach a target value independently of the expression of the decrease percentage or decrease rate of the deviation.

According to the present invention, it is determined that a trouble occurs when a state in which a deviation exceeds a threshold value continues for a certain period and the absolute value of the deviation does not decrease. Therefore, it is possible to detect a trouble in a control loop with a simple configuration at a low cost without using a conventional current sensor or the like. Moreover, because a trouble is detected in accordance with not a manipulated variable but a deviation, it is possible to naturally detect a trouble compared to the case of a manipulated variable and moreover, accurately detect the trouble by setting a threshold value.

Furthermore, a trouble detection method of the present invention is a method for detecting a trouble in a control loop including control means for outputting a manipulated variable for a controlled system in accordance with a deviation between a process variable fed back from the controlled system and a target value, comprising:

a first determination step of determining whether the deviation exceeds a threshold value;

a measurement step of measuring the period in which the deviation exceeds the threshold value;

a second determination step of determining whether the measured period exceeds a certain period;

a third determination step of determining whether the absolute value of the deviation decreases; and a trouble determination step of determining that a trouble occurs when the measured period exceeds the above certain period and the absolute value of the deviation does not decrease.

According to the present invention, it is determined that a trouble occurs when a state in which a deviation exceeds a threshold value continues for a certain period and the deviation does not decrease. Therefore, it is possible to detect a trouble in a control loop with a simple configuration at a low cost without using a conventional current sensor or the like. Moreover, because a trouble is detected in accordance with not a manipulated variable but a deviation, it is possible to naturally detect a trouble compared to the case of a manipulated variable and accurately detect the trouble by setting a threshold value.

A trouble detection apparatus of the present invention is an apparatus for detecting a trouble in a control loop including control means for outputting a manipulated variable for a controlled system in accordance with a process variable fed back from the controlled system and a target value, which comprises first determination means for determining whether the deviation exceeds a threshold value, measurement means for measuring the period in which the deviation exceeds the threshold value in accordance with a determination result by the first determination means, second determination means for determining whether the period in which the deviation exceeds the threshold value continues for a certain period, third determination means for determining whether the absolute value of the deviation decreases, and trouble determination means for determining that a trouble occurs when the period in which the deviation exceeds the threshold value continues for a certain period and the absolute value of the deviation does not decrease.

According to the present invention, because it is determined that a trouble occurs when a state in which a deviation exceeds a threshold value continues for a certain period and the deviation does not decrease, it is possible to detect a trouble in a control loop with a simple configuration at a low cost without using a conventional current sensor or the like. Moreover, because a trouble is detected in accordance with not a manipulated variable but a deviation, it is possible to naturally detect a trouble compared to the case of a manipulated variable and moreover, accurately detect the trouble by setting a threshold value.

A temperature controller of the present invention has control means for outputting a manipulated variable for a controlled system in accordance with a deviation between a process variable fed back from the controlled system and a target value and trouble determination means for determining that a trouble occurs in a control loop when the state in which the deviation exceeds the threshold value continues for a certain period and the deviation does not decrease.

According to the present invention, because it is determined that a trouble occurs when a state in which a deviation exceeds a threshold value continues for a certain period and the deviation does not decrease, it is possible to detect a trouble in a temperature control loop with a simple configuration at a low cost without using a conventional current sensor or the like. Moreover, because a trouble is detected in accordance with not a manipulated variable but a deviation, it is possible to naturally detect a trouble compared to the case of a manipulated variable and moreover, accurately detect the trouble by setting a threshold value or the like.

A temperature controller of the present invention has control means for outputting a manipulated variable for a controlled system in accordance with a deviation between a process variable fed back from the controlled system and a target value and trouble determination means for determining that a trouble occurs when the state in which the deviation exceeds the threshold value continues for a certain period and the absolute value of the deviation does not decrease.

According to the present invention, it is determined that a trouble occurs when a state in which a deviation exceeds a threshold value continues for a certain period and the deviation does not decrease. Therefore, it is possible to detect a trouble in a control loop with a simple configuration at a low cost without using a conventional current sensor or the like. Moreover because a trouble is detected in accordance with not a manipulated variable but a deviation, it is possible to naturally detect a trouble compared to the case of a manipulated variable and moreover, accurately detect the trouble by setting a threshold value or the like.

A temperature controller of the present invention has control means for outputting a manipulated variable for a controlled system in accordance with a deviation between a process variable fed back from the controlled system and a target value and trouble determination means for determining that a trouble occurs in a control loop when the state in which the deviation exceeds a threshold value continues for a certain period and the absolute value of the deviation does not decrease.

According to the present invention, it is determined that a trouble occurs when a state in which a deviation exceeds a threshold value continues for a certain period and the deviation does not decrease. Therefore, it is possible to detect a trouble in a temperature control loop with a simple configuration at a low cost without using a conventional current sensor or the like. Moreover, because a trouble is detected in accordance with not a manipulated variable but a deviation, it is possible to naturally detect a trouble compared to the case of a manipulated variable and moreover, accurately detect the trouble by setting a threshold value or the like.

In the case of a preferable embodiment of the present invention, the trouble determining means has first determination means for determining whether the deviation exceeds the threshold value, measurement means for measuring a period in which the deviation exceeds the threshold value in accordance with a determination result by the first determination means, second determination means for determining whether the period in which the deviation exceeds the threshold value continues for a certain period or more, and third determination means for determining whether the absolute value of the deviation decreases and performs determination in accordance with determination results by the second and third determination means.

According to the present invention, it is determined that a trouble occurs when a state in which a deviation exceeds a threshold value continues for a certain period and the deviation does not decrease. Therefore, it is possible to detect a trouble in a control loop with a simple configuration at a low cost without using a conventional current sensor or the like.

In the case of an embodiment of the present invention, the control loop is a PID control loop and the control means performs PID control and decision means is included which decides the threshold value in accordance with a proportional band obtained through auto-tuning and decides the certain period in accordance with a dead time, integral time, or derivative time obtained through auto-tuning.

According to the present invention, a threshold value necessary for trouble detection is automatically decided by executing auto-tuning.

DESCRIPTION OF THE PREFERRED EMBODIMENTS

Embodiments of the present invention are described below by referring to the accompanying drawings.

First Embodiment

Figure 1:
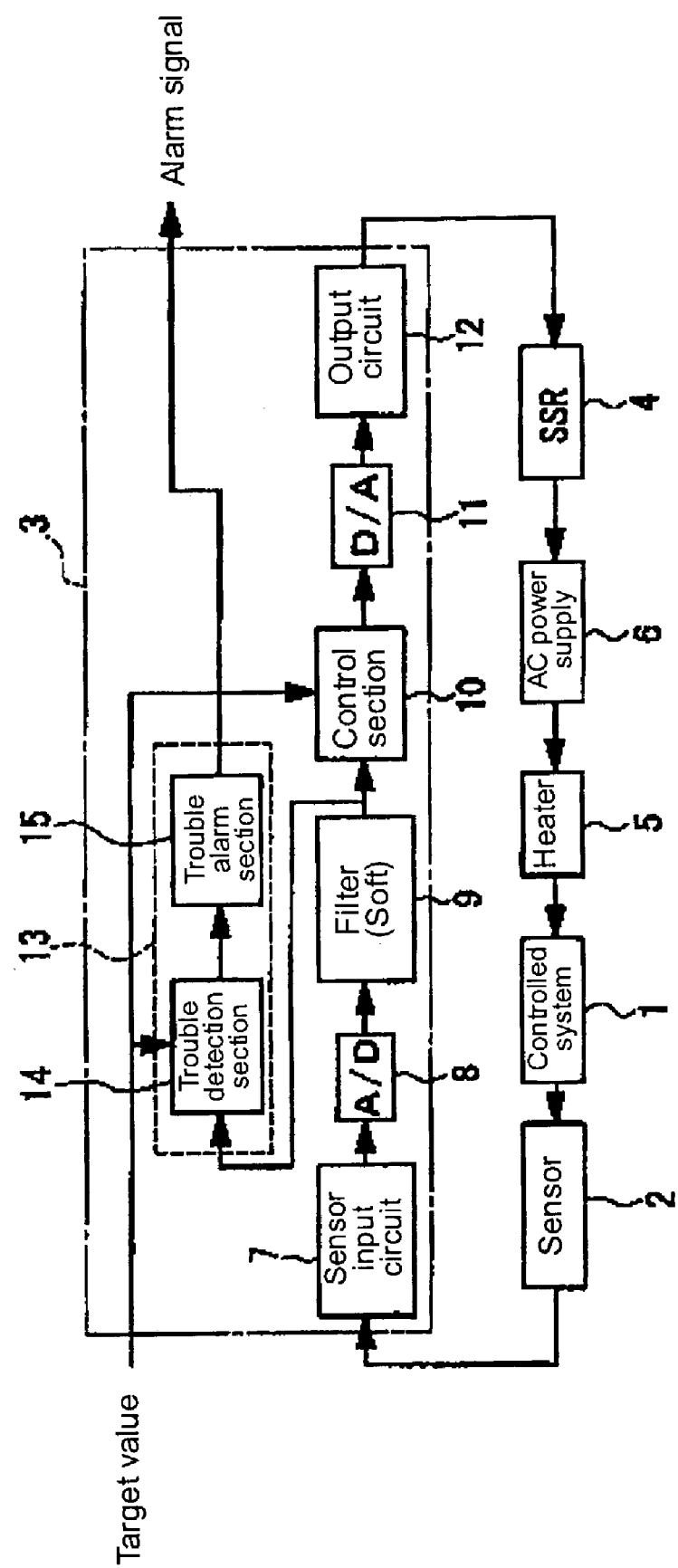
FIG. 1 is a schematic block diagram of a temperature control system to which a method of an embodiment of the present invention is applied.
Figure 17:
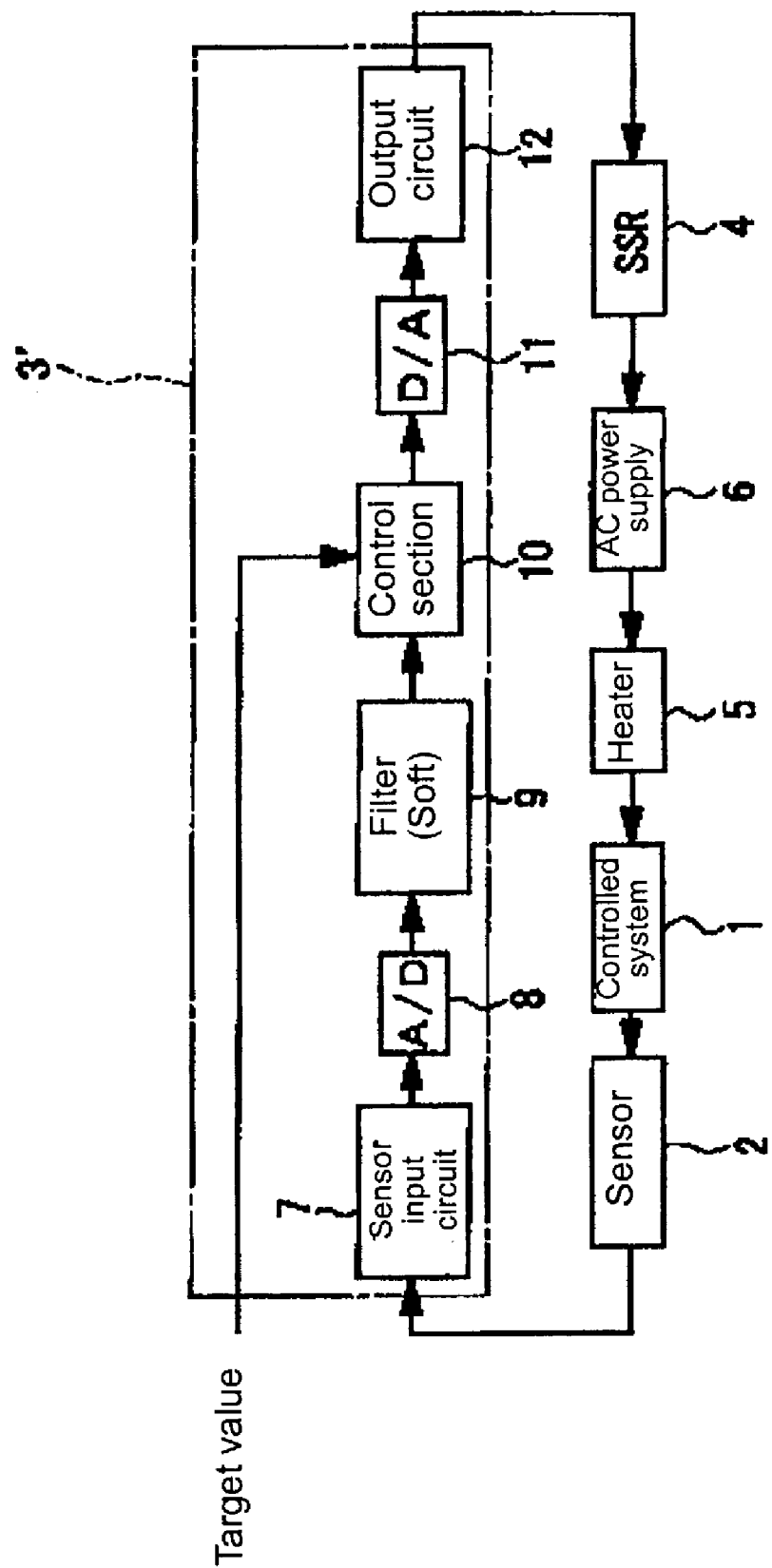
FIG. 17 is a schematic block diagram of a conventional example.
Figure 18:
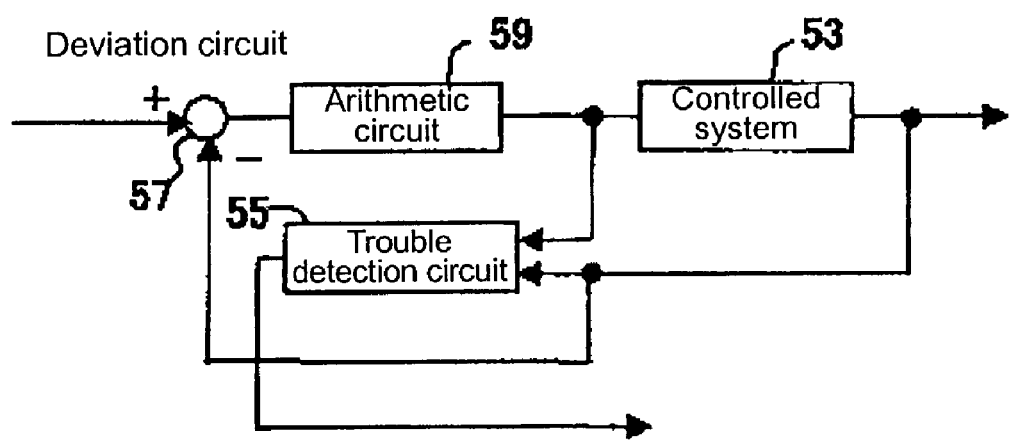
FIG. 18 is a block diagram of a control loop system of another conventional example.

FIG. 1 is a block diagram of a temperature control system having a temperature controller of the present invention, in which a portion corresponding to the above described FIG. 17 is provided with the same reference symbol.

In the case of this temperature control system, the temperature of a controlled system 1 such as a heating furnace is detected by a temperature sensor 2 and input to a temperature controller 3, and the temperature controller 3 performs a PID operation or the like in accordance with a target value (set temperature) and a detected temperature (process variable) to output an operational signal (manipulated variable) to an SSR 4, and controls power distribution to a heater 5 by an AC power supply 6 to control the temperature of the controlled system 1 so that the temperature becomes a target value.

Figure 2:
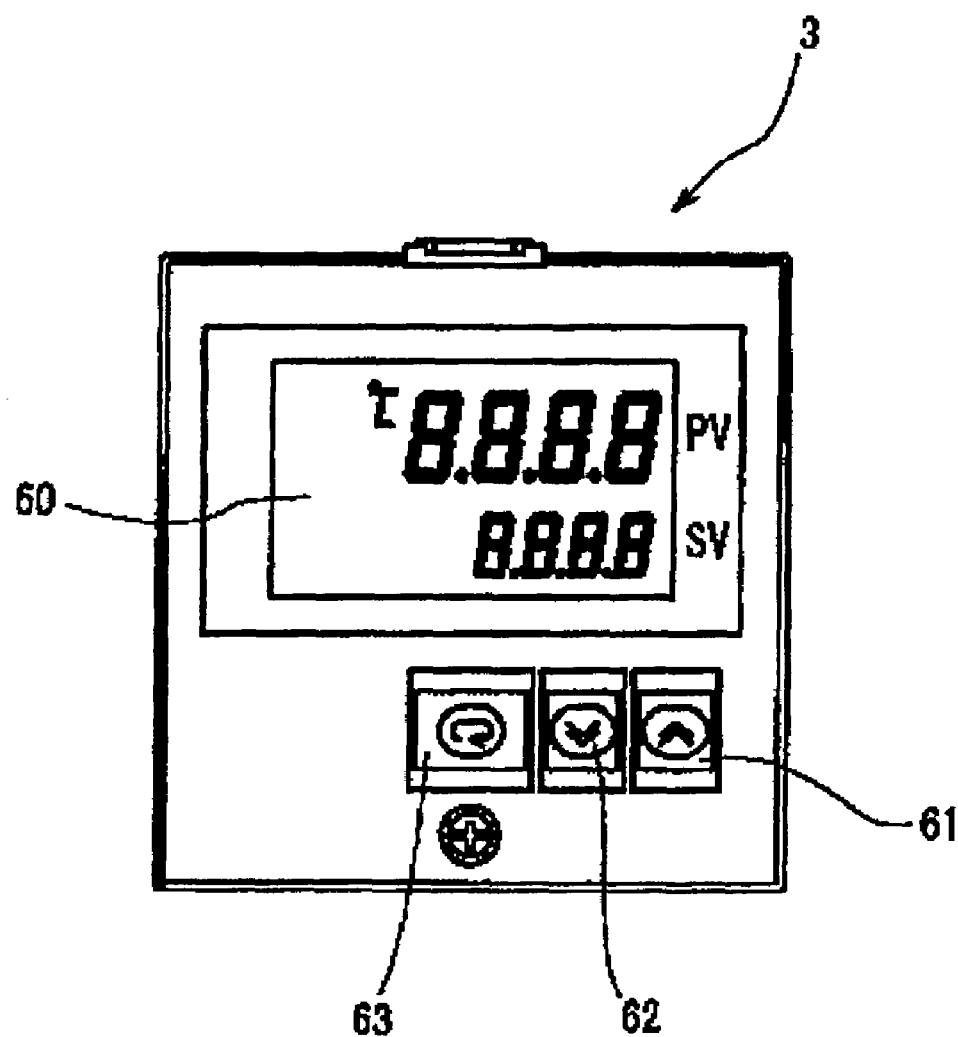
FIG. 2 is a front view of a temperature controller in FIG. 1.

As shown in FIG. 2, the temperature controller 3 has a display section 60 for displaying the present temperature and a set temperature or the like, an up key 61, down key 62, and mode key 63 at its front.

As shown in FIG. 1, the temperature controller 3 has a sensor input circuit 7 to which a feedback input is supplied from the temperature sensor 2, A/D conversion circuit 8, filter 9 according to software processing, control section (control means) 10 for performing a PID operation or the like, D/A conversion circuit 11, and output circuit 12. The above configuration is basically the same as that of a conventional example.

The temperature controller 3 of this embodiment has a built-in trouble detection apparatus 13 so that a trouble in a temperature control loop such as a disconnection or short circuit can be accurately detected with a simple configuration at a low cost. The trouble detection apparatus 13 and the above control section 10 and filter 9 are constituted by, for example, a microcomputer.

Figure 3:
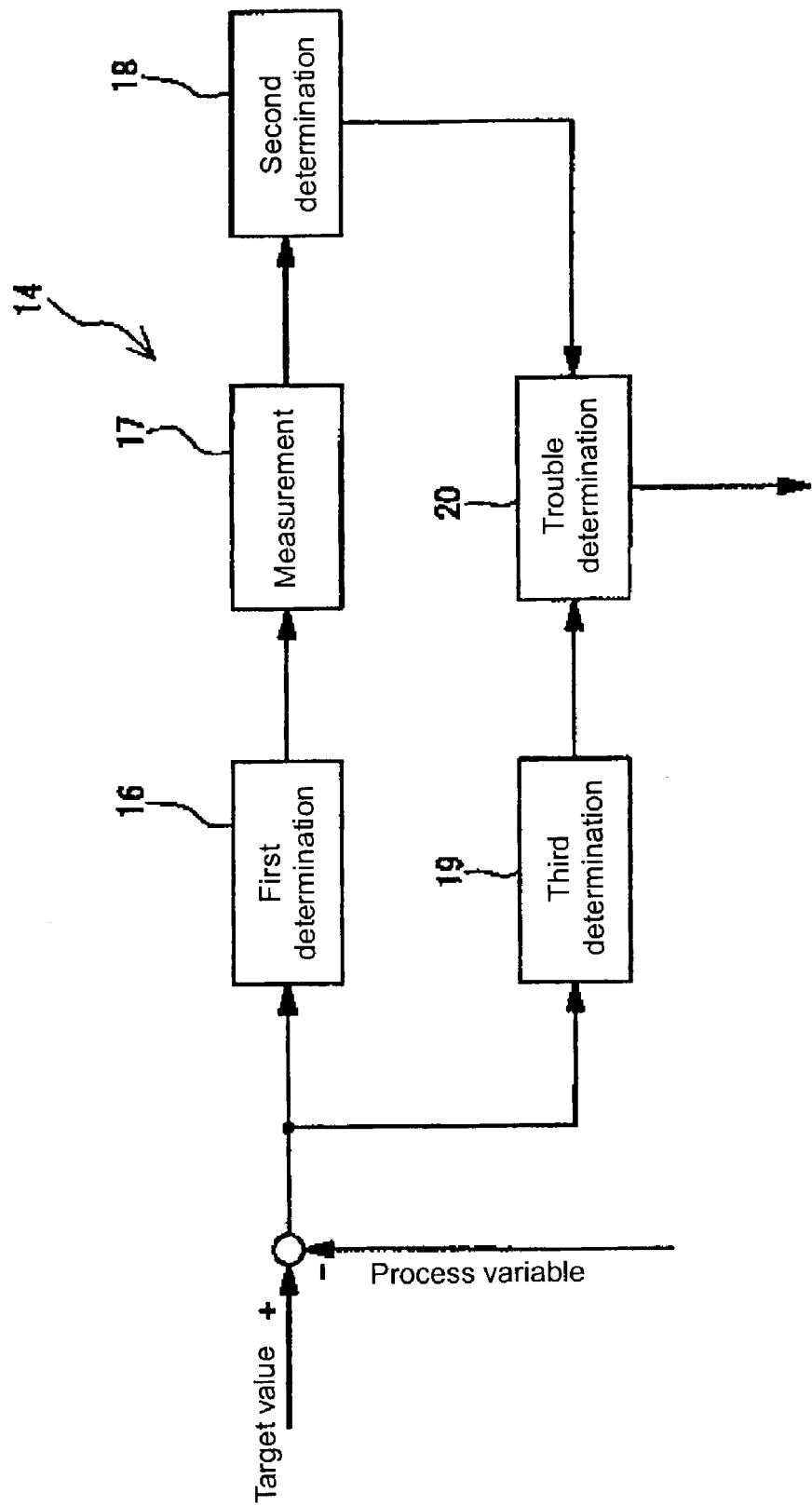
FIG. 3 is a functional block diagram of a trouble detection section in FIG. 1.

The trouble detection apparatus 13 has a trouble detection section 14 and trouble alarm section 15. As shown in FIG. 3, the trouble detection section 14 has first determination means 16 for determining whether a deviation obtained by subtracting an process variable (detected temperature) from a target value (set temperature) exceeds a predetermined positive or negative threshold value, measurement means 17 for measuring the period in which the deviation exceeds the threshold value in accordance with a determination result by the first determination means 16, second determination means 18 for determining whether the period in which the deviation exceeds the threshold value continues for a certain period or more, third determination means 19 for determining whether the absolute value of the deviation decreases, that is, the detected temperature approaches the set temperature, and trouble determination means 20 for determining that a trouble occurs when the period in which the deviation exceeds the threshold value continues for a certain period or more and the absolute value of the deviation does not decrease. A trouble determination output by the trouble determination means 20 is supplied to the trouble alarm section 15 and the trouble alarm section 15 outputs an alarm signal to an external unit. It is a matter of course that it is allowed to display an alarm or the like on the temperature controller 3 in accordance with the alarm signal.

Figure 4:
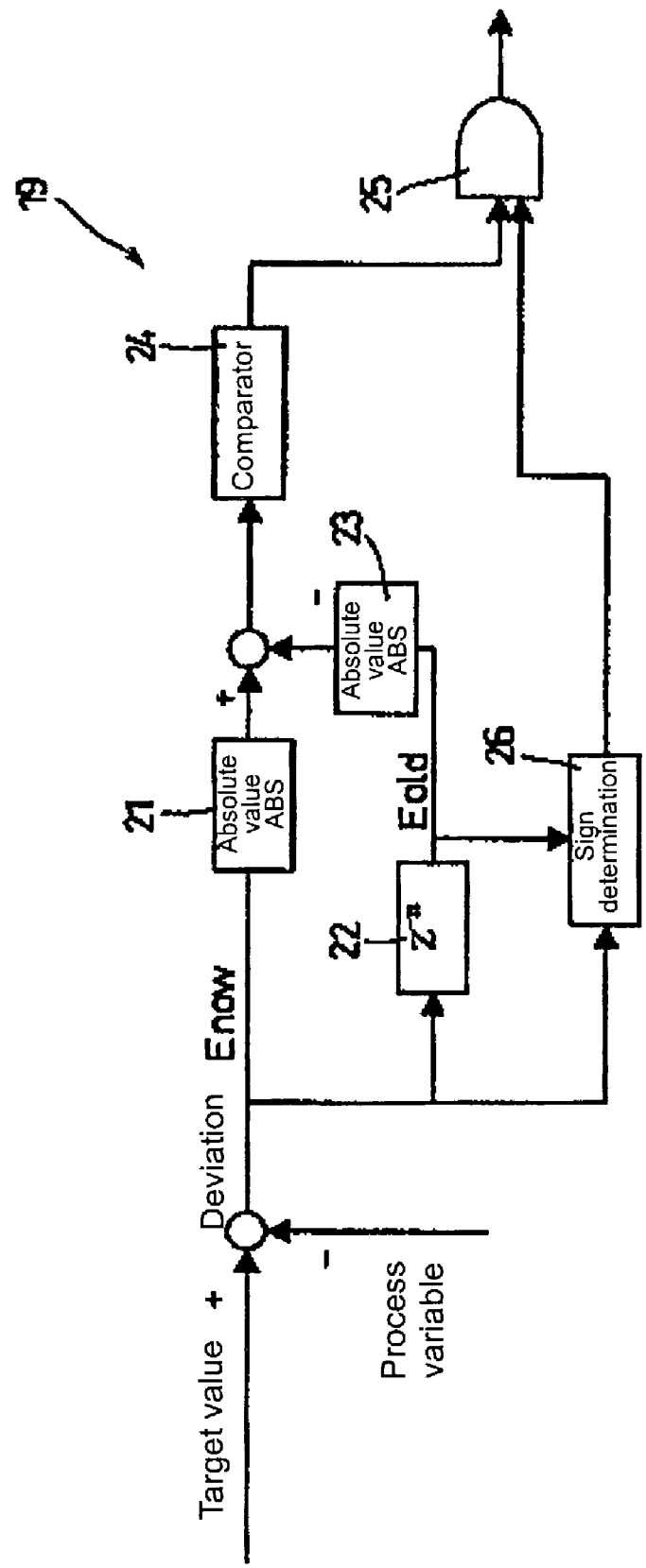
FIG. 4 is a block diagram of third determination means in FIG. 3.

FIG. 4 is an illustration showing a configuration of the third determination means 19 for determining whether the absolute value of a deviation decreases.

In FIG. 4, when a deviation $E_{old}$ before at least two sampling times or more and the present deviation $E_{now}$ have the same symbol and the value obtained by subtracting the absolute value of $E_{old}$ from that of $E_{now}$ is a default or more, it is determined that the absolute value of a deviation does not decrease.

Therefore, as shown in FIG. 4, the absolute value of the present deviation $E_{now}$ obtained by subtracting a process variable from a target value is captured by an absolute-value circuit 21 while the absolute value of the deviation $E_{old}$ before at least two sampling times or more delayed by a delay circuit 22 is captured by an absolute-value circuit 23, the difference between the absolute values is calculated and compared with a default such as "0" by a comparator 24, and when the difference is equal to or more than the default, a high-level output is supplied to an AND circuit 25 but when the difference is less than the default, a low-level output is supplied to the AND circuit 25.

Moreover, in the case of a symbol determination circuit 26, symbols of the deviations $E_{old}$ and $E_{now}$ are determined, and when the deviations have the same symbol, a high-level output is supplied to the AND circuit 25 but when the deviations have symbols different from each other, a low-level output is supplied to the AND circuit 25.

Thereby, the AND circuit 25 supplies a high-level output when the deviations $E_{old}$ and $E_{now}$ have the same symbol and the difference between absolute values is equal to or more than a default.

The sampling cycle of the third determination means 19 is set to a cycle capable of determining whether a deviation decreases in accordance with the characteristic or the like of a controlled system. For example, it is allowed to set the cycle to several seconds or several minutes.

Figure 5:
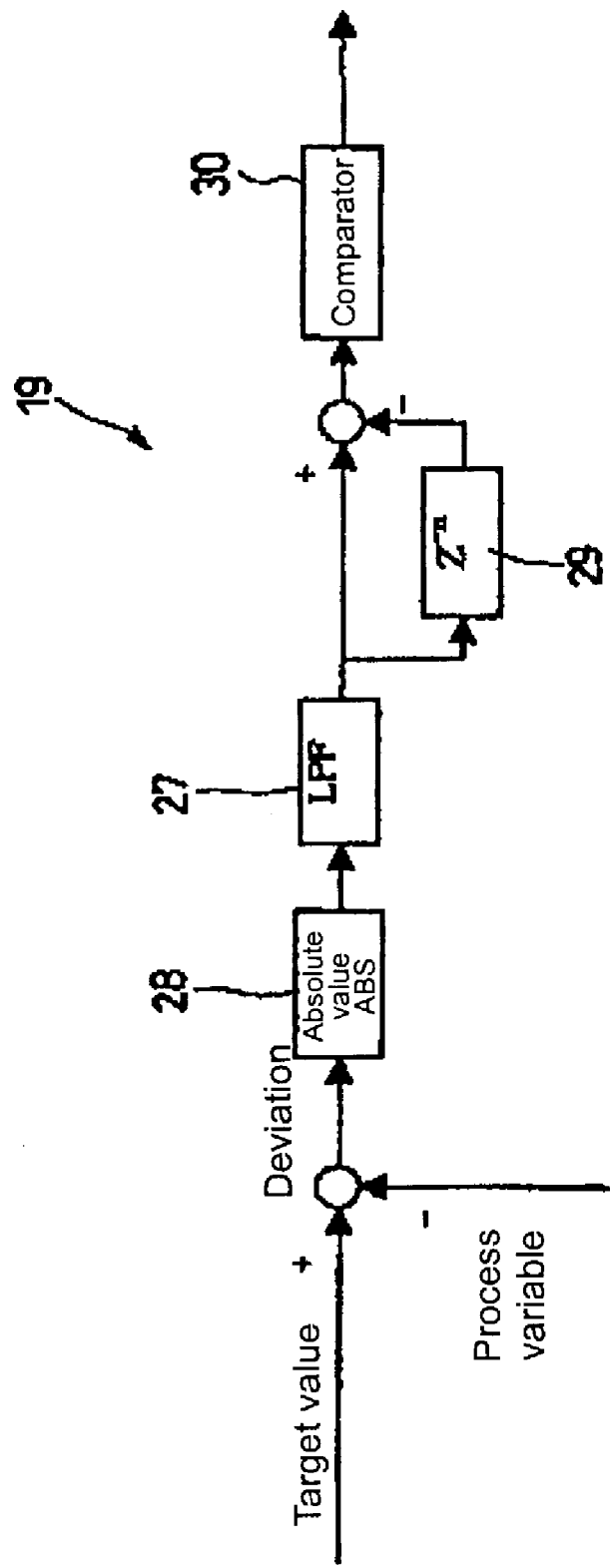
FIG. 5 is another block diagram of the third determination means.

FIG. 5 is an illustration showing another configuration of the third determination means 19. In FIG. 5, the absolute value of a deviation is input to a low-pass filter 27 to determine that the absolute value of the deviation does not decrease when the difference value or derivative value of output values of the low-pass filter 27 is equal to or more than a default.

Therefore, as shown in FIG. 5, the absolute value of a deviation obtained by subtracting a process variable from a target value is captured by an absolute-value circuit 28 to input it to the low-pass filter 27, the difference between an output of the low-pass filter and an output of the low-pass filter 27 before at least two sampling times or more delayed by a delay circuit 29 is calculated and compared with a default by a comparator 30, and when the difference is equal to or more than the default, a high-level output showing that the absolute value of the deviation does not decrease is supplied.

In FIG. 5, because it is possible to remove noises by the low-pass filter 27, it is possible to prevent a malfunction due to noises and it is allowed to set a sampling cycle to, for example, 0.1 or 0.5 seconds which is shorter than the case of the configuration in FIG. 4.

Figure 6:
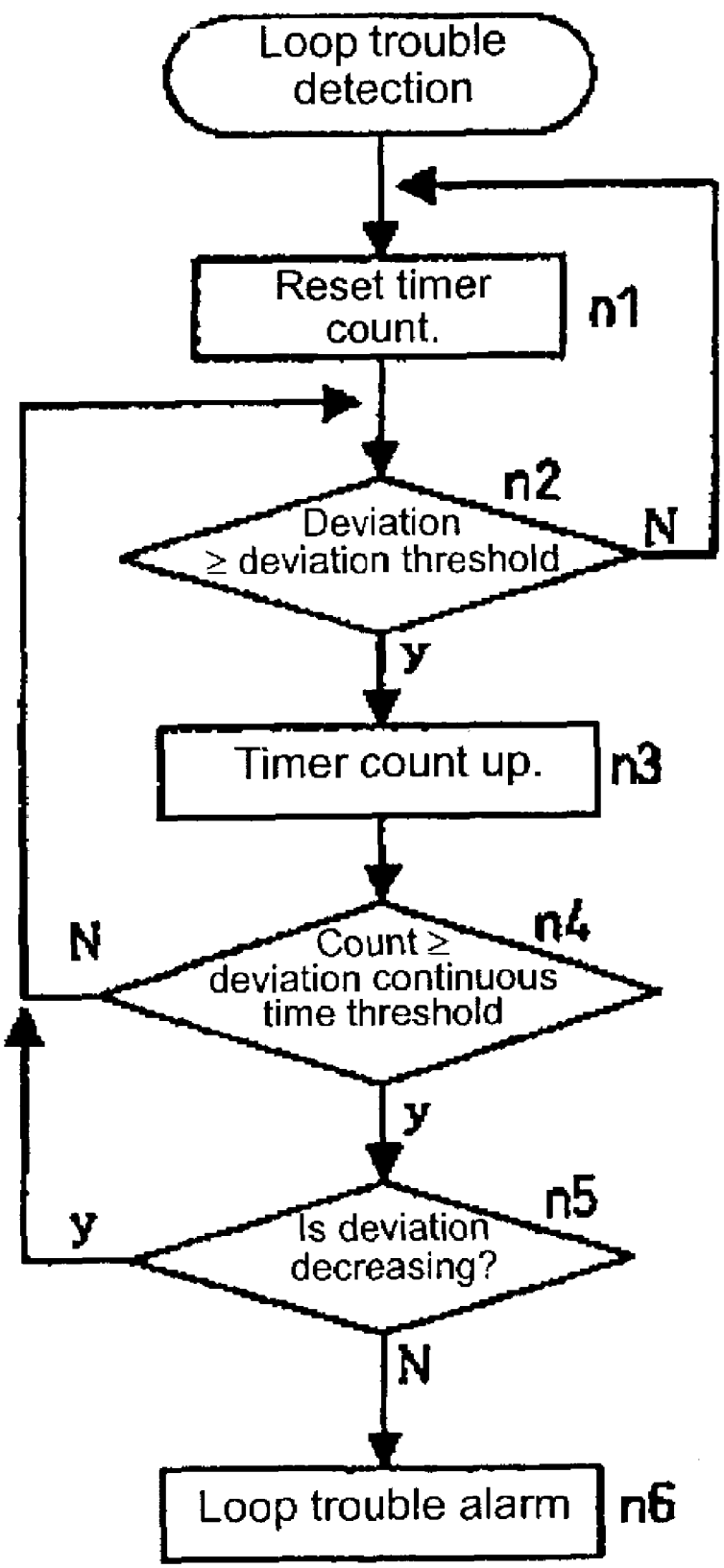
FIG. 6 is a flowchart for explaining operations of the embodiment in FIG. 1.

FIG. 6 is a flowchart of the trouble detection by a trouble detection apparatus having the above configuration.

First, timer count constituting the measurement means 17 is reset (step n1) to determine whether a deviation is equal to or more than a positive or negative threshold value (step n2). When the deviation is not equal to or more than the threshold value, step n1 is restarted When the deviation is equal to or more than the threshold value, time count is performed for measurement (step n3) to determine whether a counted value becomes a threshold value or more corresponding to a certain period (step n4). When the counted value is not the threshold value or more, step n2 is restarted. In step n4, when the counted value becomes the threshold value or more corresponding to the certain period, it is determined whether the absolute value of a deviation currently decreases as described above (step n5). When the absolute value currently decreases, step n2 is restarted. In step n5, when the absolute value of the deviation does not currently decrease, that is, when the period in which the deviation exceeds the threshold value continues for a certain period or more and the absolute value of the deviation does not decrease, it is determined that a trouble occurs in a control loop and a trouble alarm is output to end the operation (step n6).

In the case of this embodiment, the threshold value of a deviation is decided as a value obtained by multiplying a proportional band obtained through auto-tuning by a default such as "1" and the certain period is decided as a value obtained by multiplying the dead time obtained through auto-tuning by a default such as "2".

Therefore, according to this embodiment, by performing auto-tuning for obtaining a PID constant the same as ever, a threshold value and certain period are automatically decided.

Moreover, in the case of another embodiment of the present invention, it is allowed to decide the certain period in accordance with integral time or derivative time instead of dead time. Furthermore, it is allowed to set the threshold value and the certain period so that they can be input through setting by the keys 61 to 63 and it is allowed to decide the threshold value and the certain period without depending on a proportional band or dead time.

Then, operations of this embodiment are described in detail in accordance with the time charts of simulations shown in FIGS. 7 to 12.

Figure 7A:
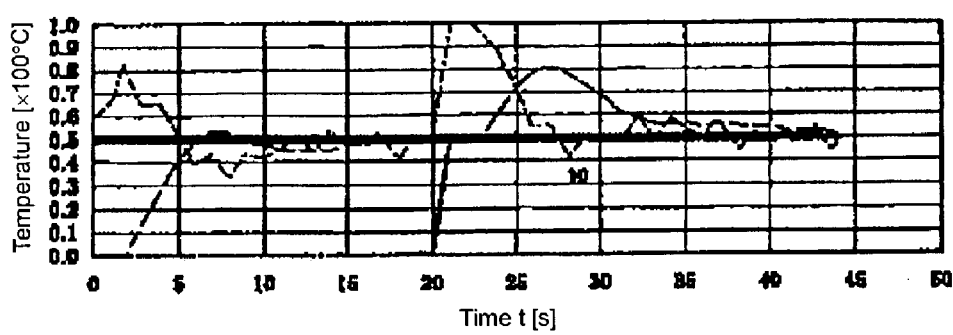
FIGS. 7A to 7E are time charts in the normal state.
Figure 7B:
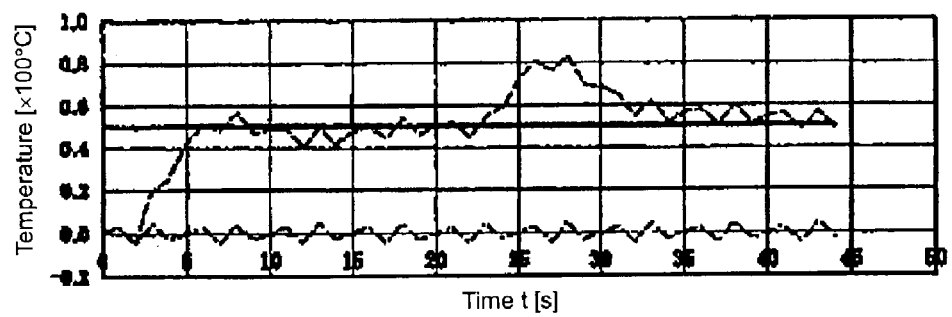
Figure 7C:
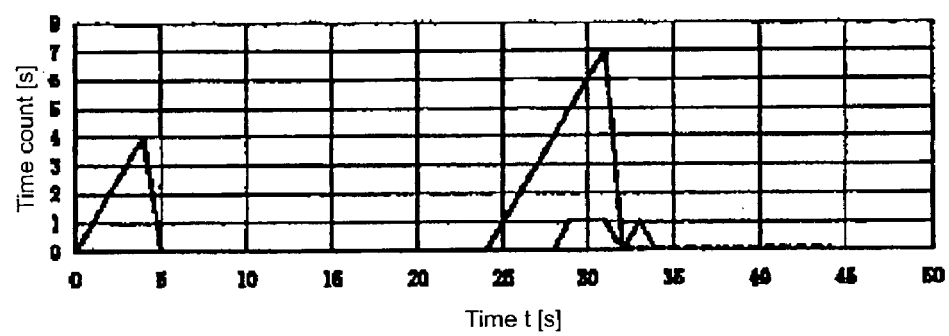
Figure 7D:
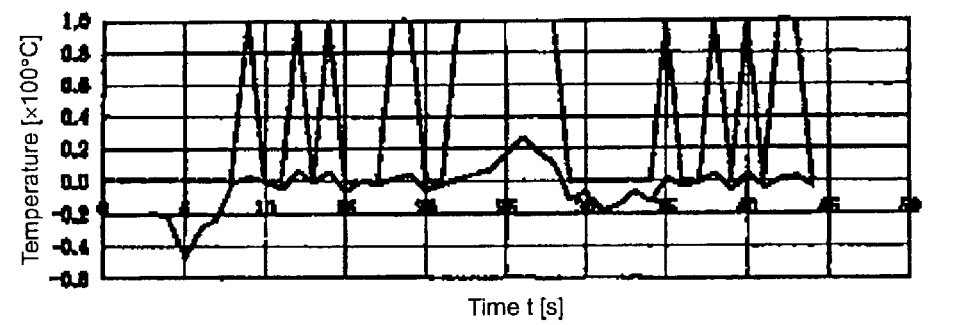
Figure 7E:
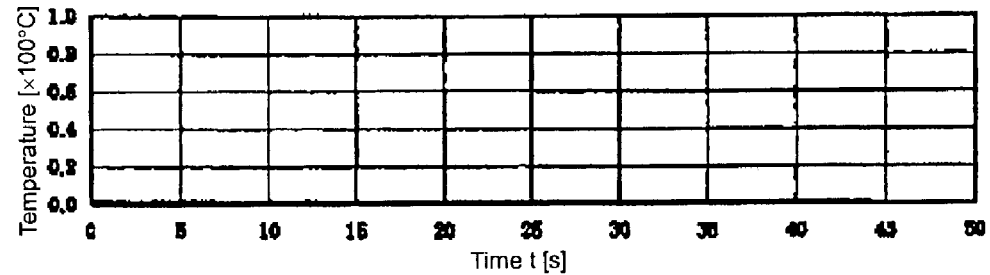

First, FIGS. 7A to 7E show normal operations, in which FIG. 7A shows target value (continuous line), true controlled variables (broken line), manipulated variable (alternate long and short dash line), and disturbance manipulated variable (alternate long and two short dashes line), FIG. 7B shows target value (continuous line), process variable (broken line), and sensor noise (alternate long and short dash line), FIG. 7C shows counted value (continuous line) of a timer counter serving as measurement means and determination output (broken line) of the second determination means 18 for determining whether a period in which a deviation exceeds a threshold value continues for a certain period or more, and FIG. 7D shows difference (continuous line) between absolute values of deviations serving as inputs of the comparator 24 in FIG. 4 and determination output (broken line) of the third determination means 19 for determining whether the absolute value of a deviation decreases, and FIG. 7E shows trouble determination output (continuous line) of the trouble determination means 20. In the case of temperature assigned to the axis of coordinate, 0° C. corresponds to ordinary temperature. Moreover, these time charts respectively show one-second one-sampling data, in which outputs slightly gently change.

First, at the time of rise, as shown in FIG. 7B, because the process variable greatly depart from the target value, the deviation exceeds the threshold value. As shown in FIG. 7C, the timer counter performs measurement. However, the deviation becomes the threshold value or less before the measured value reaches the certain period and thereby, the time counter is reset.

Thereafter, the deviation is kept equal to or less than the threshold value until a disturbance manipulated variable is applied. Therefore, measurement is not performed by the timer counter. However, as shown in FIG. 7D, because the process variable is fluctuated due to sensor noise, the difference between absolute values of deviations also fluctuates around a default or 0 in the case of this example and a change that an determination output showing that the absolute value of a deviation does not decrease is output or not output is repeated. However, because the deviation is equal to or less than the threshold value, no trouble determination output is output as shown in FIG. 7E.

Then, when the disturbance manipulated variable shown in FIG. 7A is applied, the process variable departs from the target value and the deviation becomes the threshold value or more as shown in FIG. 7B, the timer counter performs measurement as shown in FIG. 7C, and a determination output showing that a period in which a deviation exceeds a threshold value continues for a certain period or more is output when the measured value exceeds the certain period. In this case, as shown in FIG. 7D, because the difference between absolute values of deviations is less than 0, a determination output showing the absolute value of a deviation does not decrease is not output. Therefore, as shown in FIG. 7E, a trouble determination output is not output.

In the case of this example, a trouble determination output is not output under the normal state. In the case of a larger disturbance, however, it is also possible to output a trouble determination output by assuming that a trouble occurs. That is, by selecting a threshold value, certain time, or default, it is possible to output a trouble determination output by determining that a disturbance is a trouble and moreover determine a large disturbance as a trouble correspondingly to a purpose.

Figure 8A:
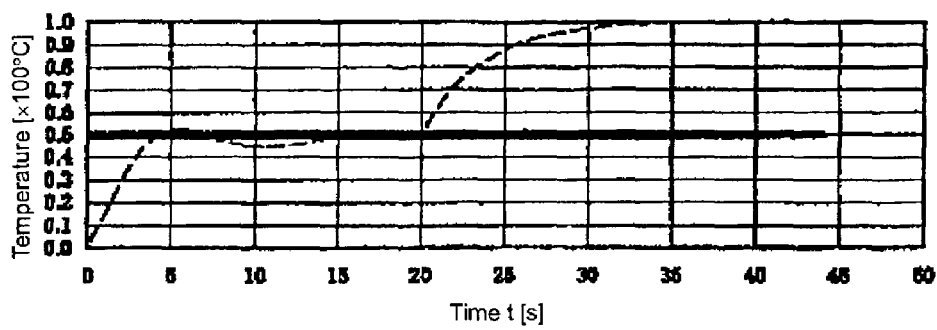
FIGS. 8A to 8E are time charts when an SSR is short-circuited.
Figure 8B:
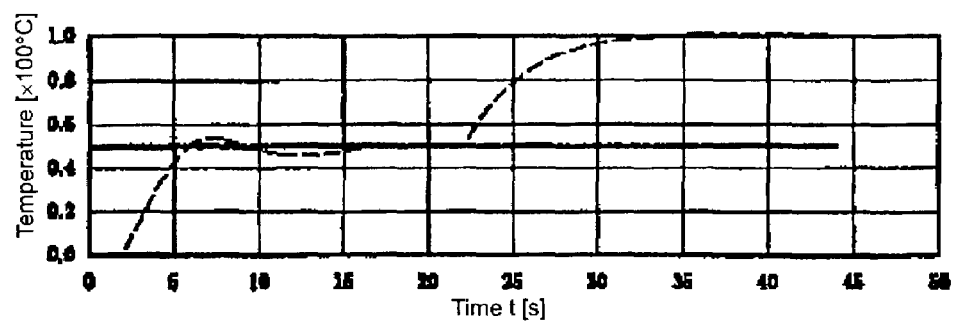
Figure 8C:
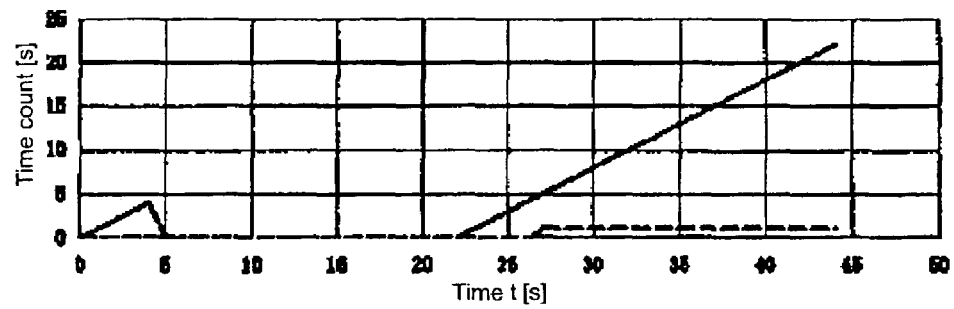
Figure 8D:
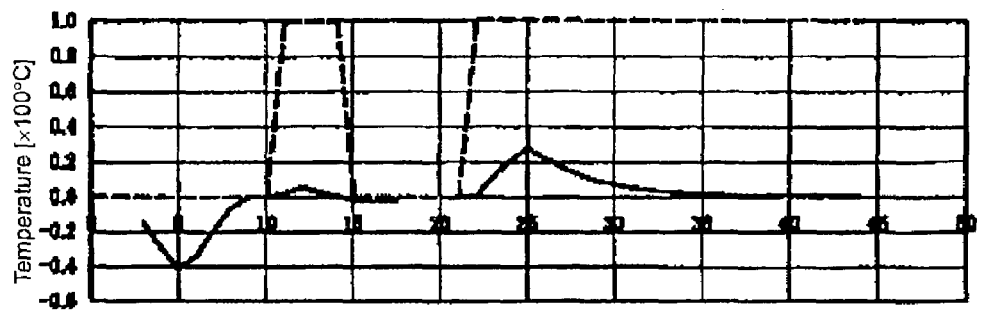
Figure 8E:
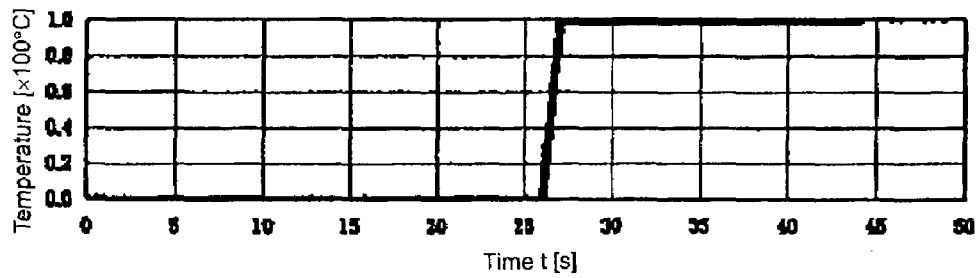

FIGS. 8A to 8E show operations of an SSR serving as the above operation unit when a short circuit occurs, in which FIG. 8A shows target value (continuous line) and true controlled variable (broken line), FIG. 8B shows target value (continuous line) and process variable (broken line), FIG. 8C shows counted value (continuous line) of a timer counter serving as measurement means and determination output (broken line) of the second determination means 18 for determining whether a period in which a deviation exceeds a threshold value continues for a certain period or more, FIG. 8D shows difference (continuous line) between absolute values of deviations and determination output (broken line) of the third determination means 19 for determining whether the absolute value of a deviation decreases, and FIG. 8E shows trouble determination output (continuous line) of the trouble determination means 20.

First, at the time of fall, as shown in FIG. 8B, because the process variable greatly departs from the target value, the deviation exceeds the threshold value and the timer counter performs measurement as shown in FIG. 8C. However, the deviation becomes equal to or less than the threshold value before the measured value reaches the above certain period and thereby, the timer counter is reset.

Thereafter, because the deviation is equal to or less than the threshold value until the SSR is short-circuited, measurement is not performed by the timer counter. In the case of this example, however, because the process variable becomes lower than the target value and returns to the target value again, the difference between absolute values of deviations also exceeds 0 which is a default and a determination output showing that the absolute value of a deviation doest not decrease is output as shown in FIG. 8D. However, because the deviation is equal to or less than the threshold value, a trouble determination output is not output as shown in FIG. 8E.

Then, when the SSR is short-circuited, the process variable rises and the deviation exceeds the threshold value as shown in FIG. 8B, the timer counter serving as measurement means performs measurement, and when the measured value reaches a certain period, a determination output showing that a period in which a deviation exceeds a threshold value continues for a certain period or more is output as shown in FIG. 8C.

Moreover, because the difference between absolute values of deviations becomes 0 which is a default or more, a determination output showing that the absolute value of a deviation does not decrease is output as shown in FIG. 8D and thereby, a trouble determination output is output as shown in FIG. 8E.

Figure 9A:
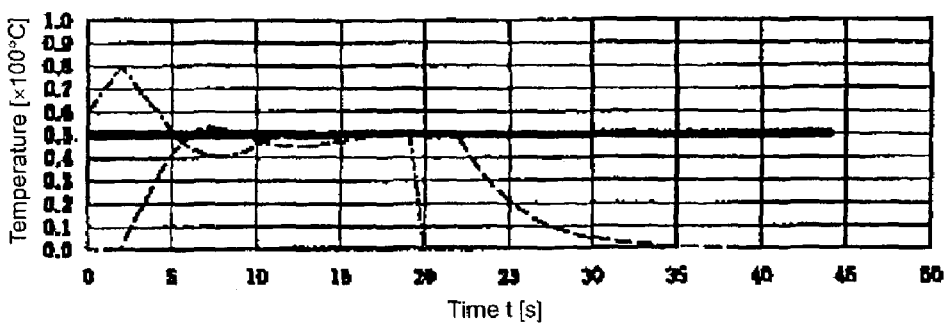
FIGS. 9A to 9E are time charts when a heater is disconnected.
Figure 9B:
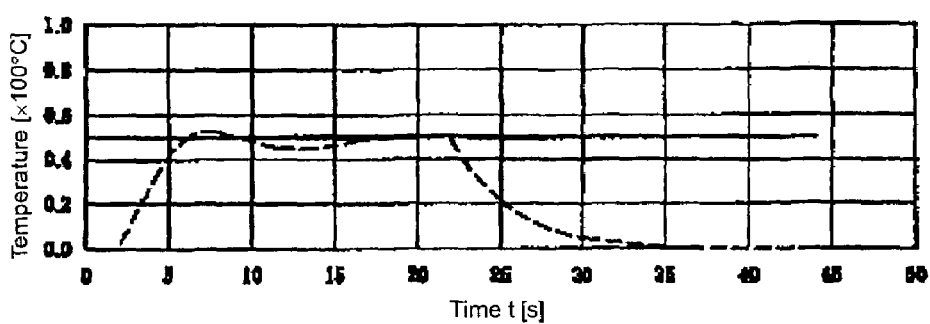
Figure 9C:
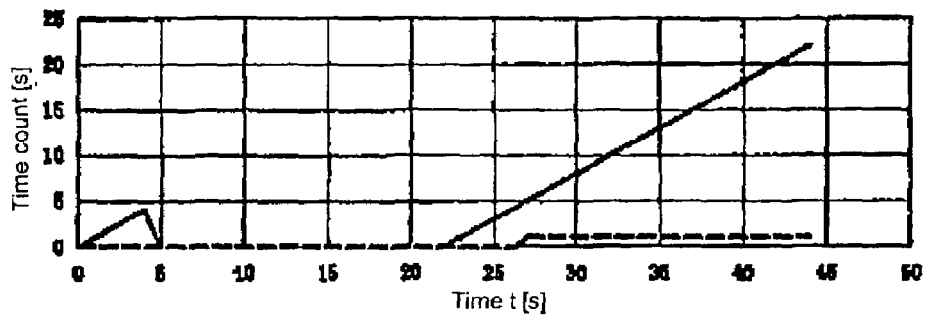
Figure 9D:
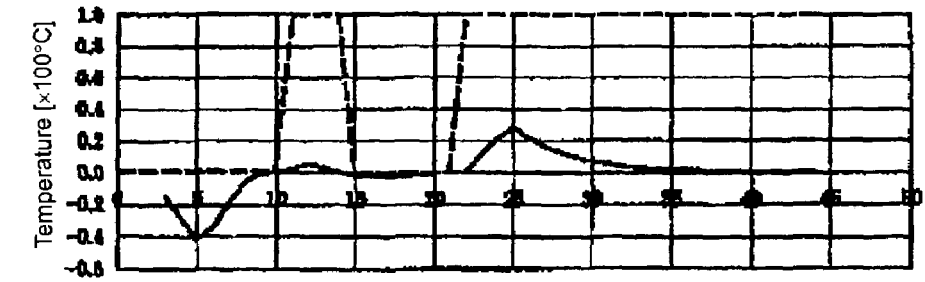
Figure 9E:
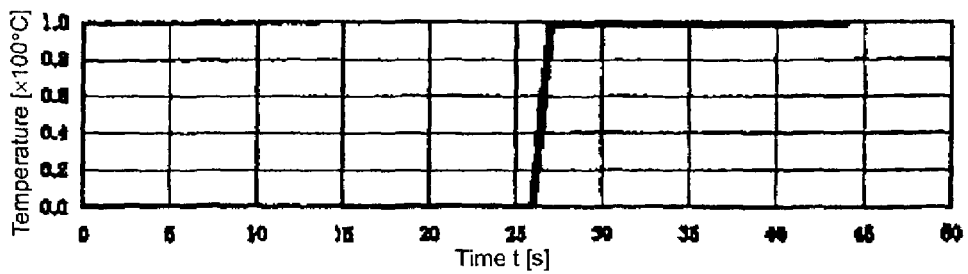

FIGS. 9A to 9E show operations when a heater is disconnected, in which FIG. 9A shows target value (continuous line), true controlled variable (broken line), and manipulated variable (alternate long and short dash line), FIG. 9B shows target value (continuous line) and process controlled variable (broken line), FIG. 9C shows counted value (continuous line) of a timer counter serving as measurement means and determination output (broken line) of the second determination means 18 for determining whether a period in which a deviation exceeds a threshold value continues for a certain period or more, FIG. 9D shows difference (continuous line) between absolute values of deviations and determination output (broken line) of the third determination means 19 for determining whether a period in which the absolute value of a deviation decreases, and FIG. 9E shows trouble determination output (continuous line) of the trouble determination means 20.

Operations until a heater is disconnected are the same as the case in which the above SSR is short-circuited.

When a heater is disconnected, no manipulated variable is applied as shown in FIG. 9A, the process controlled variable decreases and the deviation exceeds the threshold value as shown in FIG. 9B, and the timer counter serving as measurement means performs measurement as shown in FIG. 9C and when the measured value reaches a certain period, outputs a determination output showing that a period in which a deviation exceeds a threshold value continues for a certain period or more.

Moreover, because the difference between absolute values of deviations becomes 0 which is a default or more, a determination output showing that the absolute value of a deviation does not decrease is output as shown in FIG. 9D and thereby, a trouble determination output is output as shown in FIG. 9E.

Figure 10A:
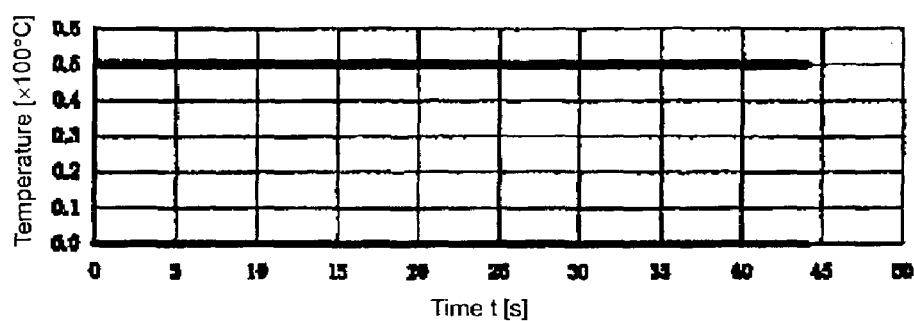
FIGS. 10A to 10E are time charts when a sensor is disconnected.
Figure 10B:
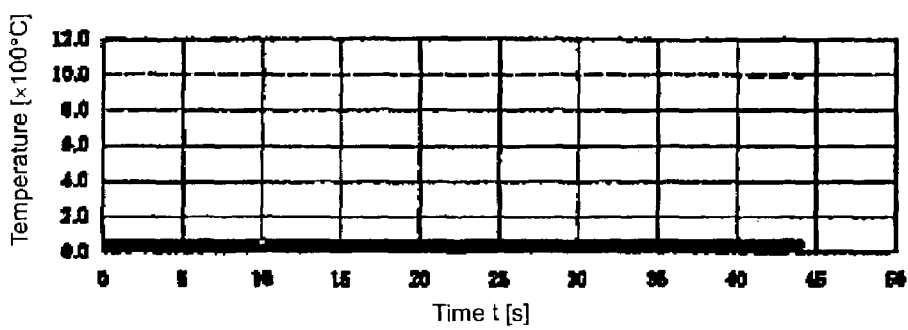
Figure 10C:
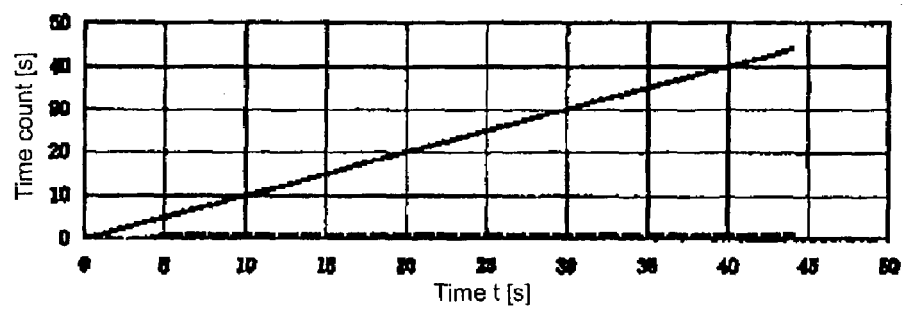
Figure 10D:
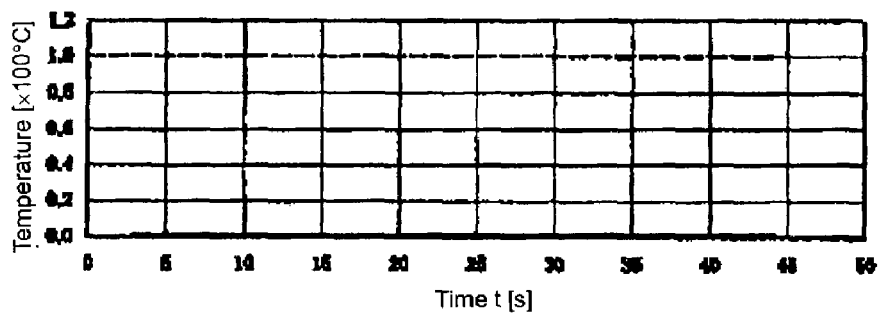
Figure 10E:
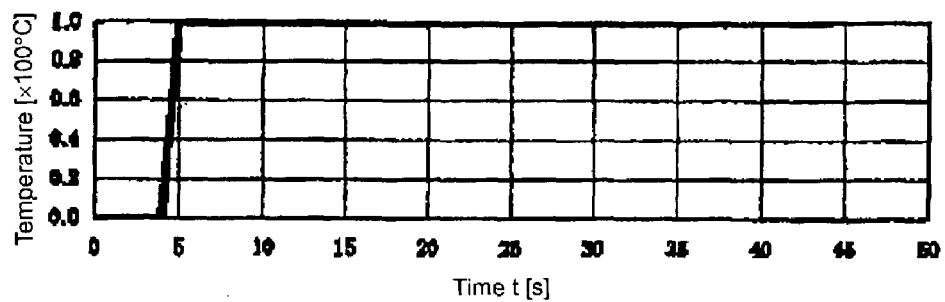

FIGS. 10A to 10E show operations when a sensor is disconnected, in which FIG. 10A shows target value (continuous line), true controlled variable (broken line), and manipulated variable (alternate long and short dash line), FIG. 10B shows target value (continuous line) and process variable (broken line), FIG. 10C shows counted value of a timer counter serving as measurement means and determination output of the second determination means 18 (broken line) for determining whether a period in which a deviation exceeds a threshold value continues for a certain period or more, FIG. 10D shows difference (continuous line) between absolute values of deviations and determination output of the third determination means 19 for determining whether the absolute value of a deviation decreases, and FIG. 10E shows trouble determination output of the trouble determination means 20.

In FIG. 10A, the true controlled variable (broken line) overlaps with the manipulated variable (alternate long and short dash line) at 0, 0.

When the sensor is disconnected, the true controlled variable shown in FIG. 10A becomes a very high temperature as a sensor input (process variable) as shown in FIG. 10B and therefore, the manipulated variable becomes 0 as shown in FIG. 10A.

Moreover, the process variable greatly departs from the target value and the deviation exceeds the threshold value as shown in FIG. 10B, the timer counter serving as measurement means performs measurement, and when the measured value reaches a certain period, a determination output showing that a period in which a deviation exceeds a threshold value continues for a certain period or more is output as shown in FIG. 10C.

Moreover, because the difference between absolute values of deviations becomes 0 which is a default, a determination output showing that the absolute value of a deviation does not decrease is output as shown in FIG. 10D and thereby, a trouble determination output is output as shown in FIG. 10E.

Figure 11A:
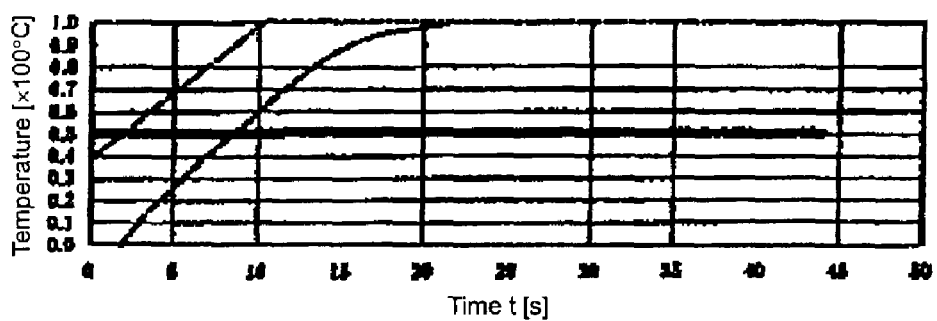
FIGS. 11A to 11E are time charts when a sensor is short-circuited.
Figure 11B:
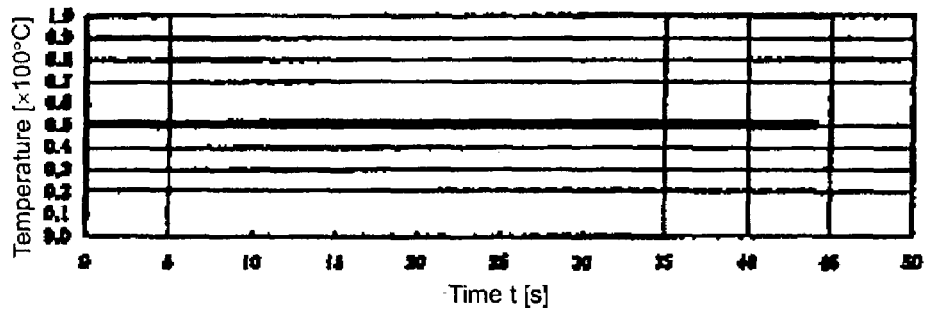
Figure 11C:
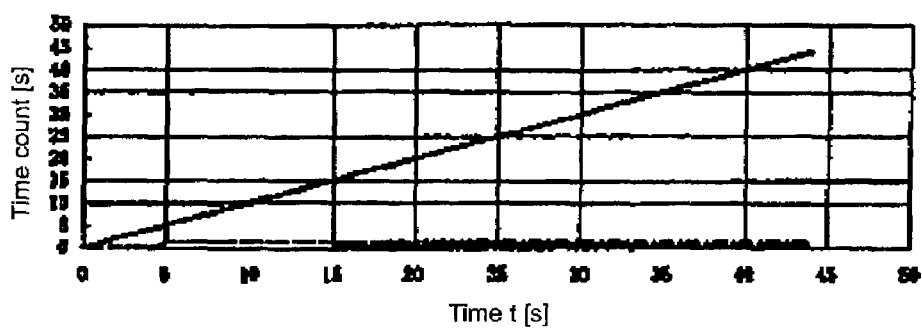
Figure 11D:
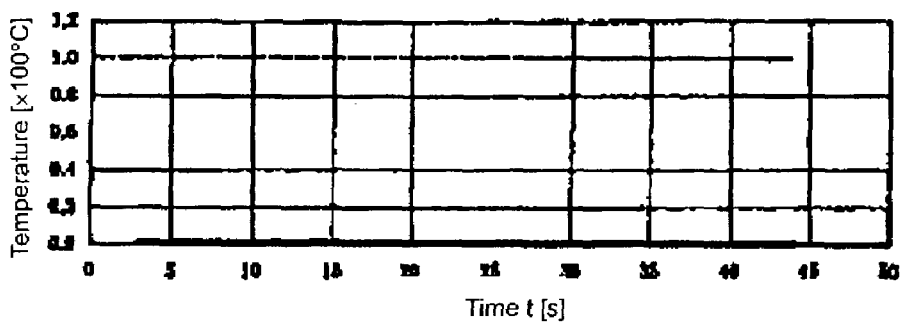
Figure 11E:
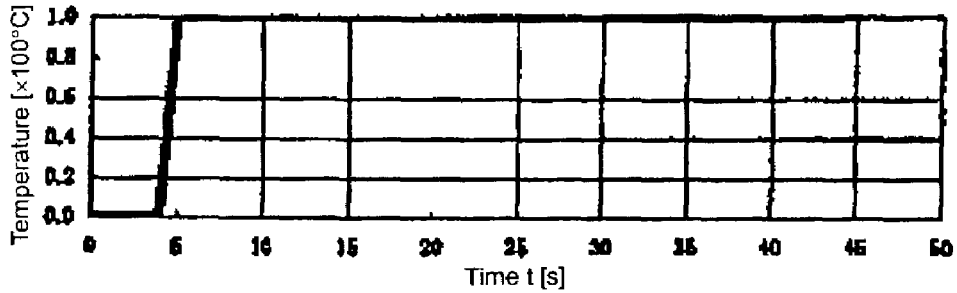

FIGS. 11A to 11E show operations when a sensor is short-circuited, in which FIG. 11A shows target value (continuous line), true controlled variable (broken line), and manipulated variable (alternate long and short dash line), FIG. 11B shows target value (continuous line), and process variable (broken line), FIG. 11C shows counted value (continuous line) of a timer counter serving as measurement means and determination output of the second determination means 18 for determining whether a period in which a deviation exceeds a threshold value continues for a certain period, FIG. 11D shows difference (continuous line) between absolute values of deviations and determination output of the third determination means 19 for determining whether the absolute value of a deviation decreases, and FIG. 11E shows trouble determination output (continuous line) of the trouble determination means 20.

When the sensor is short-circuited, not a temperature to be controlled but an ambient temperature nearby the ordinary temperature is input as a process variable as shown in FIG. 11B. Therefore, the manipulated variable and true controlled variable rise as shown in FIG. 11A.

Moreover, because the process variable departs from the target value as shown in FIG. 11B, the deviation exceeds the threshold value and the timer counter serving as measurement means performs measurement and when the measured value reaches a certain period, outputs a determination output showing that a period in which a deviation exceeds a threshold value continues for a certain period or more is output as shown in FIG. 11C.

Moreover, because the difference between absolute values of deviations becomes 0 which is a default as shown in FIG. 1D, a determination output showing that the absolute value of a deviation does not decrease is output and thereby, a trouble determination output is output as shown in FIG. 11E.

As described above, it is possible to accurately detect troubles such as heater disconnection, SSR short-circuit, sensor short-circuit, and sensor disconnection without using a current sensor or the like.

The present invention makes it possible to detect not only heater disconnection, SSR short-circuit, sensor short-circuit, and sensor disconnection but also every trouble causing the phenomenon that a deviation does not decrease. For example, it is possible to detect power failure of a heater power source, breakdown of an A/D converter or D/A converter, trouble of a sensor input circuit, trouble of an output circuit, and large disturbance exceeding a heater capacity as troubles.

Figure 12A:
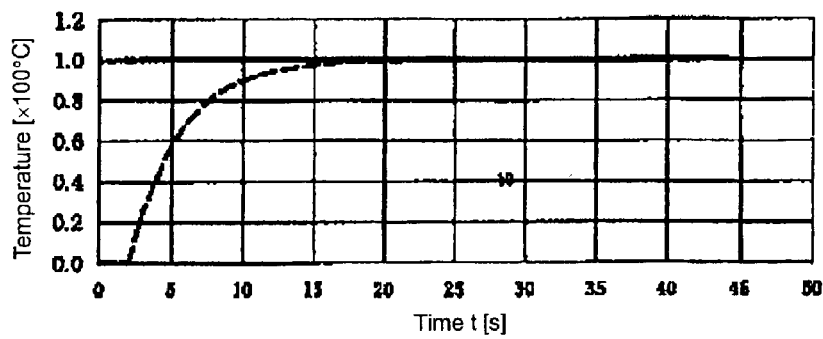
FIGS. 12A to 12E are time charts in the normal state.
Figure 12B:
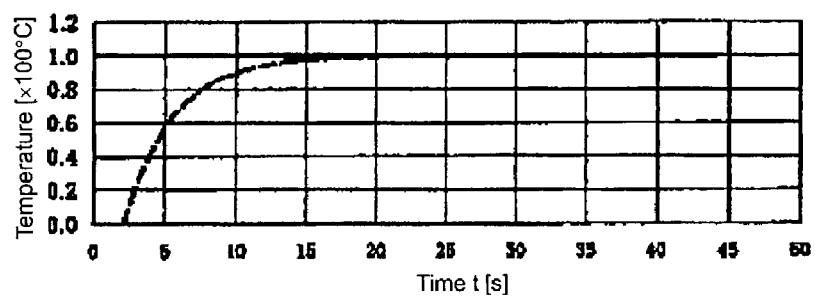
Figure 12C:
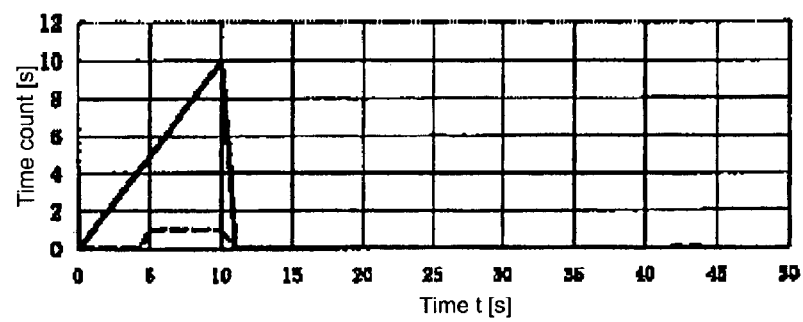
Figure 12D:
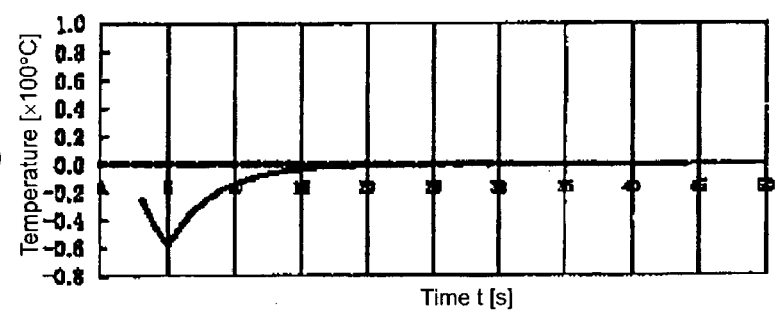
Figure 12E:
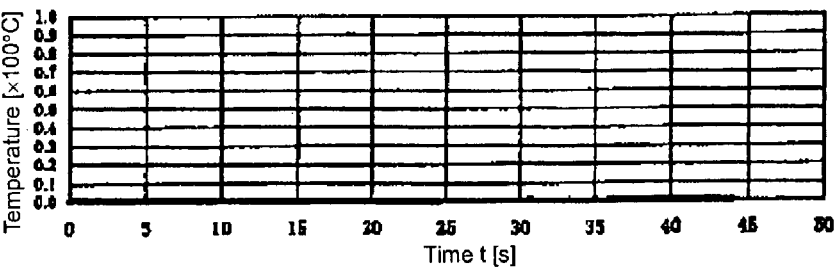

FIGS. 12A to 12E show operations when a steady manipulated variable is 100%, in which FIG. 12A shows target value (continuous line), true controlled variable (broken line), and manipulated variable (alternate long and short dash line), FIG. 12B shows target value (continuous line) and process variable (broken line), FIG. 12C shows counted value (continuous line) of a timer counter serving as measurement means and determination output (broken line) of the second determination means 18 for determining whether a period in which a deviation exceeds a threshold value continues for a certain period or more, FIG. 12D shows difference (continuous line) between absolute values of deviations and determination output (broken line) of the third determination means 19 for determining whether the absolute value of a deviation decreases, and FIG. 12E shows trouble determination output (continuous line) of the trouble determination means 20. In FIG. 12A, the target value overlaps with the manipulated variable.

In the case of this embodiment, a steady manipulated variable is not detected as a trouble even if the variable is 100%. However, in the case of the above conventional example, when a manipulated variable is 100% but a temperature does not rise over a predetermined reference-temperature range, the variable is erroneously detected as a trouble.

Second Embodiment

Figure 13:
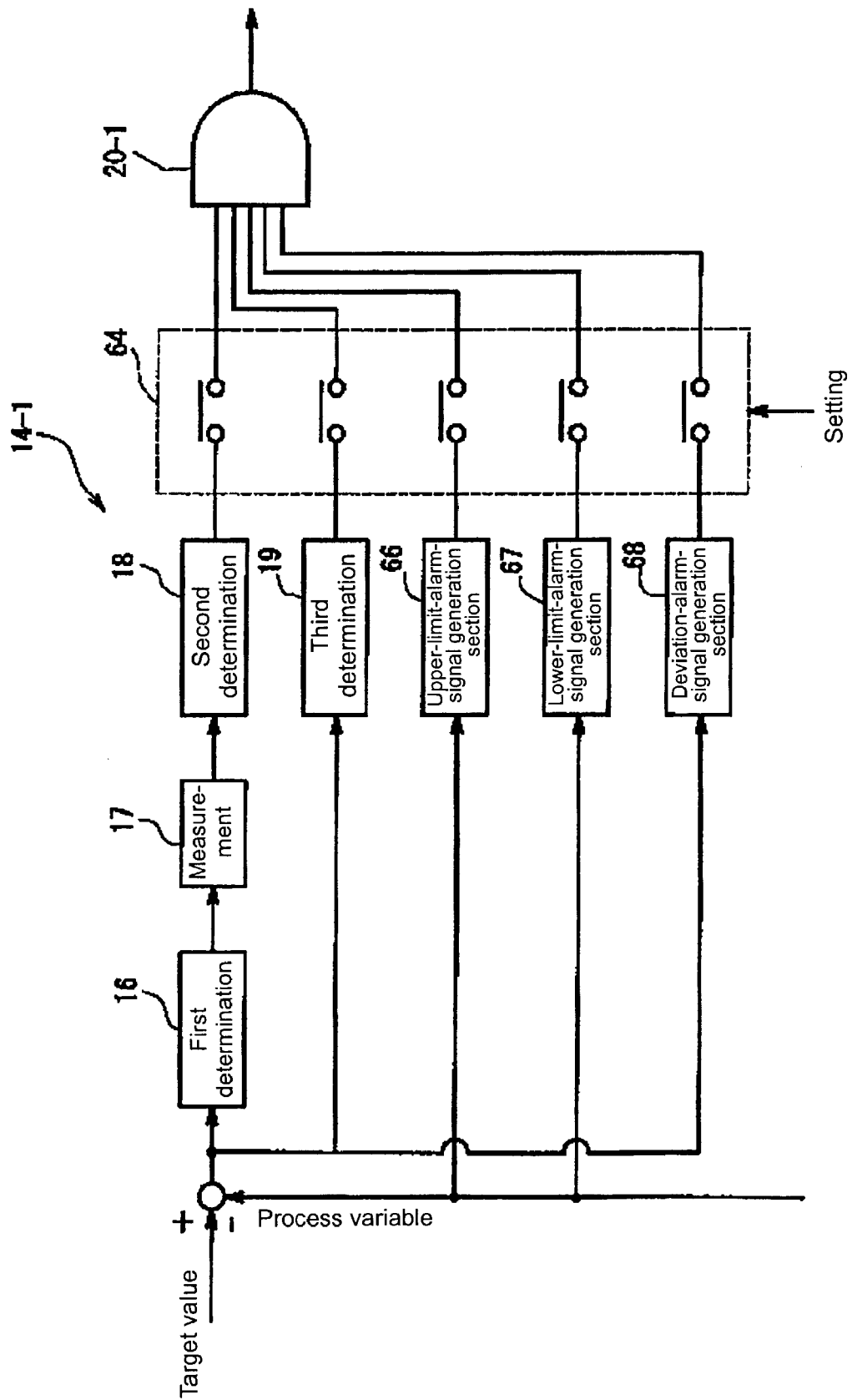
FIG. 13 is a block diagram of a trouble detection section of another embodiment of the present invention.

FIG. 13 is a block diagram of a trouble detection section 14-1 of a temperature controller of another embodiment of the present invention, in which a portion corresponding to that in the above FIG. 3 is provided with the same reference symbol.

In the case of the embodiment 1, when the AND condition between the first condition signal which is a determination output of the second determination means (first condition-signal output means) 18 and the second condition signal which is a determination output of the third determination means (second condition-signal output means) 19 is satisfied, the trouble determination means 20 determines that a trouble occurs and outputs a trouble determination signal.

However, in the case of the embodiment 2, it is possible to detect a trouble by performing the same determination as the case of the embodiment 1 and moreover, when a user selects and sets conventionally-publicly-known alarm signals such as an upper-limit alarm signal output from an upper-limit-signal generation section 66 when a detected temperature exceeds a predetermined upper-limit temperature, a lower-limit alarm signal output from a lower-limit-alarm-signal generation section 67 when the detected temperature becomes lower than a predetermined lower-limit temperature, and a deviation alarm signal output from a deviation-alarm-signal generation section 68 when a deviation departs from a predetermined range as condition signals by operating keys, these selected condition signals are supplied to an AND circuit 20-1 serving as trouble determination means by selection means 64 and a trouble determination signal is output when all the selected condition signals are satisfied.

The above selecting and setting of condition signals are performed by referring to an operation manual or the like, selecting a mode through operations of various keys 61 to 63 and selecting desired condition signals.

As another embodiment of the present invention, it is allowed that trouble determination means can select and set, for example, an OR condition other than an AND condition.

Thereby, a user can detect a trouble by combining condition signals according to necessity.

Third Embodiment

Figure 14:
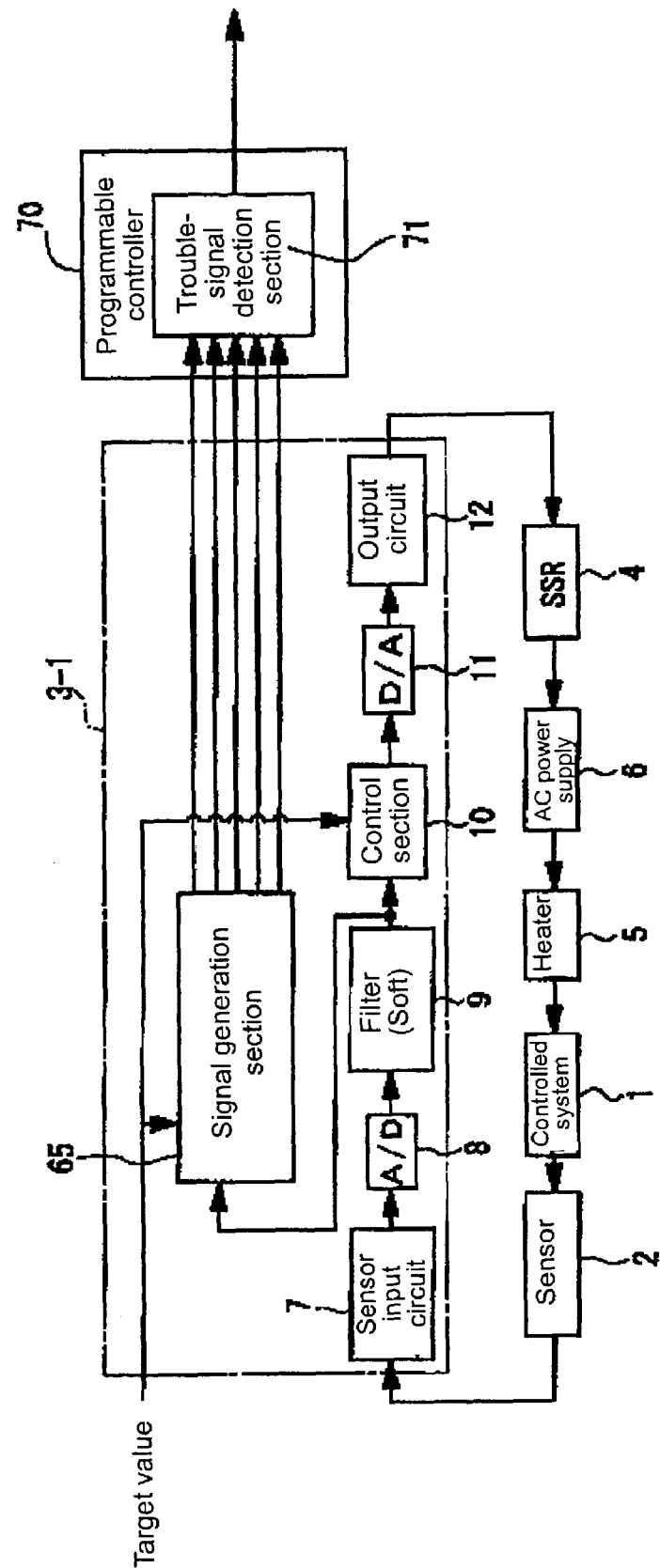
FIG. 14 is a block diagram of a temperature control system having a temperature controller of another embodiment of the present invention.

FIG. 14 is a block diagram of a temperature control system of still another embodiment of the present invention, in which a portion corresponding to that in FIG. 1 is provided with the same reference symbol.

A temperature controller 3-1 of this embodiment has a condition-signal generation section 65 instead of the trouble detection section 14 and trouble alarm section 15.

Figure 15:
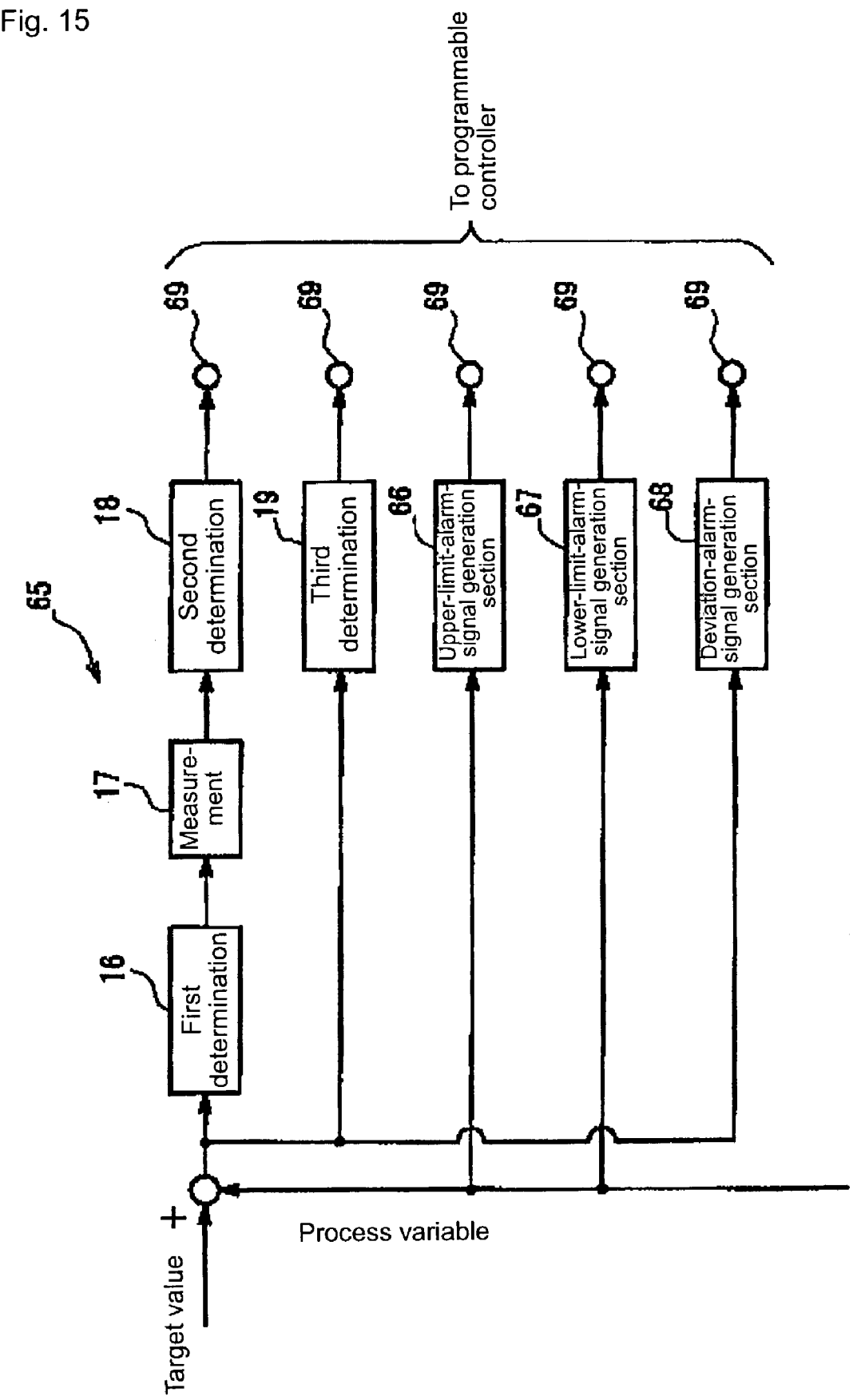
FIG. 15 is a block diagram of a condition-signal generation section in FIG. 14.

As shown in FIG. 15, the condition-signal generation section 65 generates a first condition signal which is a determination output of the second determination means (first condition-signal output means) 18, a second condition signal which is a determination output of the third determination means (second condition-signal output means) 19, and upper-limit alarm signal, lower-limit alarm signal, and deviation alarm signal which are alarm signals output from the alarm-signal generation sections 66 to 68 and outputs the signals to a programmable controller 70 as condition signals.

A trouble is detected by a trouble detection section 71 of the programmable controller 70 to which the above condition signals are supplied. Operations of the trouble detection section 71 are set by the programmable controller 70 and performed the same as the embodiment 1 or 2 does.

It is also allowed to determine a trouble by using a personal computer instead of the programmable controller 70 or fetch a trouble determination output by combining relays.

Forth Embodiment

Figure 16:
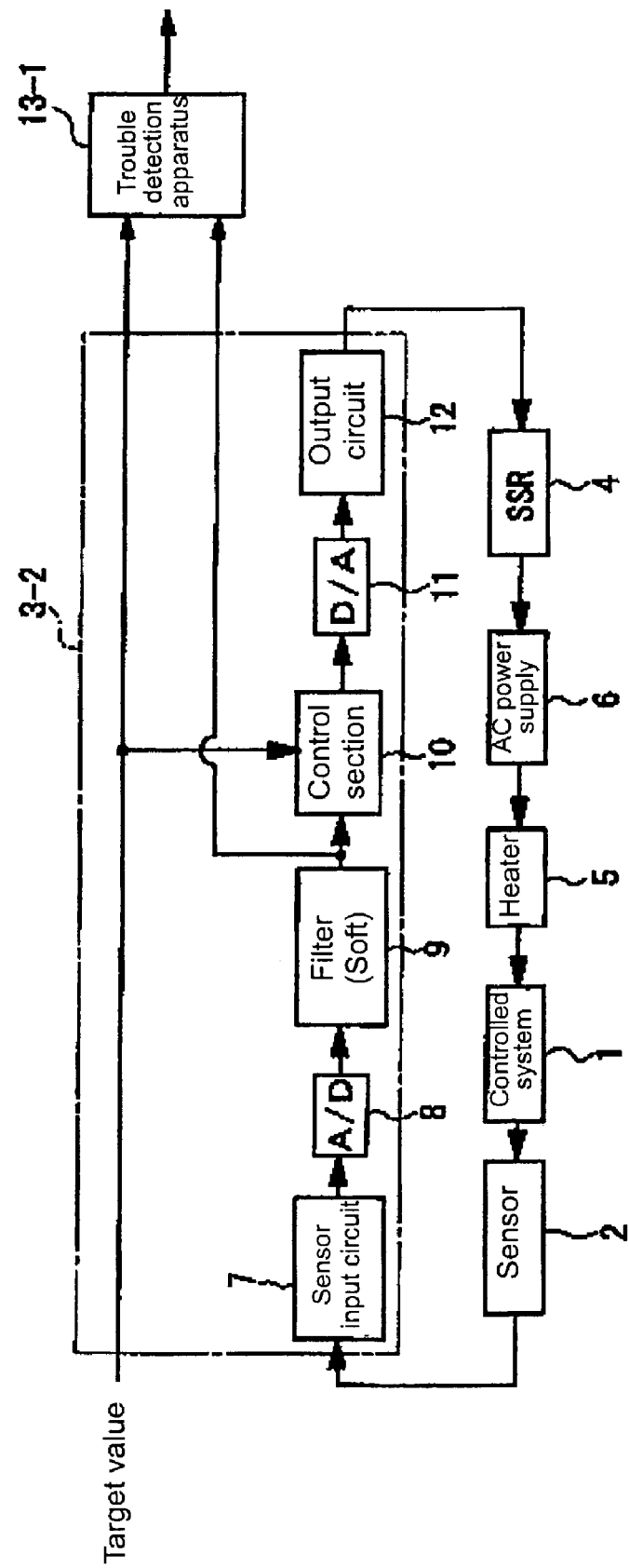
FIG. 16 is a block diagram of a temperature control system having a temperature controller and trouble detection apparatus of another embodiment of the present invention.

FIG. 16 is a block diagram of a temperature control system of another embodiment of the present invention, in which a portion corresponding to that in FIG. 1 is provided with the same reference symbol.

In the case of this embodiment, a temperature controller 3-2 has an output terminal for outputting a target value and a controlled variable to an external unit and a trouble detection apparatus 13-1 detects the same trouble as the embodiment 1 does in accordance with the target value and controlled variable supplied from the temperature controller 3-2.

That is, the trouble detection apparatus 13-1 has a trouble detection section 14 and a trouble alarm section 15 the same as the trouble detection apparatus 13 of the embodiment 1 does and detects the same trouble as the embodiment 1 does.

In the case of the embodiment 4, a target value and controlled variable are output from the temperature controller 3-2 to the trouble detection apparatus 13-1. However, it is also allowed to output a deviation or output only a target value and capture a detected temperature from a sensor 2.

Other Embodiments

In the case of the present invention, when changing a target value like a ramp, a state in which a deviation exceeds a threshold value may continue for a certain period and a condition that the absolute value of the deviation does not decrease may be satisfied. However, in the case of a change of the ramp-like target values, it is necessary not to detect a trouble while the target values are changed.

Each of the above embodiments is described by applying it to trouble detection of a temperature control loop. However, it is allowed to apply the present invention not only to temperature control but also to trouble detection of various control loops such as those of pressure, flow rate, liquid level, position, speed, and number of revolutions.

It is allowed to regard a deviation as a value obtained by subtracting a target value from a process variable (feedback value).

As described above, according to the present invention, it is determined that a trouble occurs when a state in which a deviation exceeds a threshold value continues for a certain period and the absolute value of the deviation does not decrease. Therefore, it is possible to detect various troubles such as heater disconnection, sensor disconnection, and sensor short-circuit each of which causes a phenomenon that the absolute value of a deviation does not decrease with a simple configuration at a low cost without using a current sensor or the like. Moreover, it is possible to detect a trouble at a high accuracy compared to the case of a conventional example which detects a trouble by using a manipulated variable.

What is claimed is:

1. A trouble detection method for detecting a trouble in a control loop including control means for outputting a manipulated variable for a controlled system in accordance with a deviation between a process variable fed back from the controlled system and a target value, comprising:

determining that a trouble occurs in the control loop when a measured period in which the deviation exceeds a first threshold value is greater than or equal to a second threshold value, the second threshold value corresponding to a duration of a certain period, and the deviation does not decrease within the measured period.

2. The trouble detection method according to claim 1, wherein the trouble occurring in the control loop corresponds to at least one of a heater disconnection, an SSR short circuit, a sensor short circuit, a sensor disconnection, power failure of a heater power source, a breakdown of an A/D or D/A converter, trouble of a sensor input circuit, trouble of an output circuit, or a disturbance exceeding a heater capacity.

3. A trouble detection method for detecting a trouble in a control loop including control means for outputting a manipulated variable for a controlled system in accordance with a deviation between a process variable fed back from the controlled system and a target value, comprising:
  determining that a trouble occurs in the control loop when a measured period in which the deviation exceeds a first threshold value is greater than or equal to a second threshold value, the second threshold value corresponding to a duration of a certain period, and the absolute value of the deviation does not decrease within the measured period.

4. A trouble detection method for detecting a trouble in a control loop including control means for outputting a manipulated variable for a controlled system in accordance with a deviation between a process variable fed back from the controlled system and a target value, comprising:
  determining whether the deviation exceeds a first threshold value;
  measuring a period in which the deviation exceeds the first threshold value;
  determining whether the measured period exceeds a second threshold value, the second threshold value corresponding to a duration of a certain period;
  determining whether the absolute value of the deviation decreases; and
  determining that a trouble occurs in the control loop when the measured period exceeds the second threshold value corresponding to the duration of the certain period and the absolute value of the deviation does not decrease within the measured period.

5. A trouble detection apparatus for detecting a trouble in a control loop including control means for outputting a manipulated variable for a controlled system in accordance with a deviation between a process variable fed back from the controlled system and a target value, comprising:
  first determination means for determining whether the deviation exceeds a first threshold value;
  measurement means for measuring a period in which the deviation exceeds the first threshold value in accordance with a determination result by the first determination means;
  second determination means for determining whether the measured period in which the deviation exceeds the first threshold value is greater than or equal to a second threshold value, the second threshold value corresponding to a duration of a certain period in accordance with a measurement result by the measurement means;
  third determination means for determining whether the absolute value of the deviation decreases; and
  trouble determination means for determining that a trouble occurs in the control loop when the measured period in which the deviation exceeds the first threshold value is greater than or equal to the second threshold value corresponding to the duration of the certain period and the absolute value of the deviation does not decrease within the measured period in accordance with determination results by the second and third determination means.

6. A temperature controller comprising:
  control means for outputting a manipulated variable for a controlled system in accordance with a deviation between a process variable fed back from the controlled system and a target value; and
  trouble determination means for determining that a trouble occurs in a control loop when a measured period in which the deviation exceeds a first threshold value is greater than or equal to a second threshold value, the second threshold value corresponding to a duration of a certain period, and the deviation does not decrease within the measured period.

7. A temperature controller comprising:
  control means for outputting a manipulated variable for a controlled system in accordance with a deviation between a process variable fed back from the controlled system and a target value; and
  trouble determination means for determining that a trouble occurs in a control loop when a measured period in which the deviation exceeds a first threshold value is greater than or equal to a second threshold value, the second threshold value corresponding to a duration of a certain period, and the absolute value of the deviation does not decrease within the measured period.

8. The temperature controller according to claim 7, wherein the trouble determination means comprises:
  first determination means for determining whether the deviation exceeds the first threshold value;
  measurement means for measuring the measured period in which the deviation exceeds the first threshold value in accordance with a determination result by the first determination means;
  second determination means for determining whether the measured period in which the deviation exceeds the first threshold value is greater than or equal to the second threshold value corresponding to the duration of the certain period in accordance with a measurement result by the measurement means; and
  third determination means for determining whether the absolute value of the deviation decreases and determination is executed in accordance with determination results by the second and third determination means.

9. The temperature controller according to claim 7, wherein the control loop is a PID (proportional plus integral plus derivation) control loop, the control means performs PID control, and further comprising:
  decision means for deciding the threshold value in accordance with a proportional band obtained through auto-tuning and deciding the certain period in accordance with a dead time, integral time, or differential time obtained through auto-tuning.

10. A temperature controller comprising:
  a controller which outputs a manipulated variable for a controlled system in accordance with a deviation between a process variable fed back from the controlled system and a target value; and
  a trouble determination unit which determines that a trouble occurs in a control loop when a measured period in which the deviation exceeds a first threshold value is greater than or equal to a second threshold value, the second threshold value corresponding to a duration of a certain period, and the deviation does not decrease within the measured period.

* * * * *